US006449118B1

(12) United States Patent
Choi et al.

(10) Patent No.: US 6,449,118 B1
(45) Date of Patent: Sep. 10, 2002

(54) MAGNETIC RECORDING/REPRODUCING APPARATUS

(75) Inventors: Do-Young Choi; Young-Ho Cho; Hyeong-Seok Choi; Chung-Hum Baik; Jun-Young Kim; Seung-Woo Lee; Sung-Hee Hong; Seung-Han Lee, all of Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/456,420

(22) Filed: Dec. 8, 1999

(30) Foreign Application Priority Data

| Dec. 8, 1998 | (KR) | 98-24472 |
| Dec. 8, 1998 | (KR) | 98-24473 |
| Dec. 8, 1998 | (KR) | 98-53712 |
| Dec. 8, 1998 | (KR) | 98-53713 |
| Dec. 8, 1998 | (KR) | 98-53714 |
| Dec. 8, 1998 | (KR) | 98-53715 |
| Dec. 8, 1998 | (KR) | 98-53716 |
| Dec. 8, 1998 | (KR) | 98-53718 |
| Dec. 8, 1998 | (KR) | 98-53719 |
| Jul. 22, 1999 | (KR) | 99-29707 |
| Jul. 22, 1999 | (KR) | 99-29709 |
| Jul. 22, 1999 | (KR) | 99-29712 |
| Jul. 22, 1999 | (KR) | 99-29713 |

(51) Int. Cl.$^7$ .............................................. G11B 5/027
(52) U.S. Cl. ........................................................ 360/85
(58) Field of Search ............................. 360/85, 95, 93

(56) References Cited

U.S. PATENT DOCUMENTS 6,157,512 A * 12/2000 Matsuoka et al. ............ 360/85
6,198,592 B1 * 3/2001 Hirabayashi et al. ......... 360/85

* cited by examiner

Primary Examiner—Allen Cao
(74) Attorney, Agent, or Firm—Robert E. Bushnell, Esq.

(57) ABSTRACT

A magnetic recording/reproducing apparatus, having a driving source; a main chassis on which the driving source is mounted; a sub chassis which is disposed to the main chassis so as to be slid in a front and rear direction, and which is provided with various tape running elements; a head drum device which is mounted on the main chassis; a loading system provided with a supply side pole base driving device and a winding side pole base driving device which loads a tape depending on the moving operation of the sub chassis in the front and rear direction; a running system which runs the tape in a desired direction at a desired speed; a main power transmitting unit which selectively transmits a power of the power source to the loading system or the running system; a cam gear which is rotated by the main power transmitting unit and transmits the power to each mode; a slider which is disposed between the main chassis and the sub chassis so as to be slid in a left and right direction and interlocked with the cam gear; a mode detecting unit which detects each mode according to the tape running; a tape tension regulating unit which applies a proper tension to the tape; an automatic separating unit which automatically blocks a power transmission to the loading system in a particular mode; a connecting unit which permits the power transmission to the loading system in a particular mode; and a connection maintaining unit which maintains the power transmission at the time of loading/unloading the tape or in the early re-connection which transmits again the power to the loading system.

21 Claims, 34 Drawing Sheets

Fig. 15
Fig. 15A
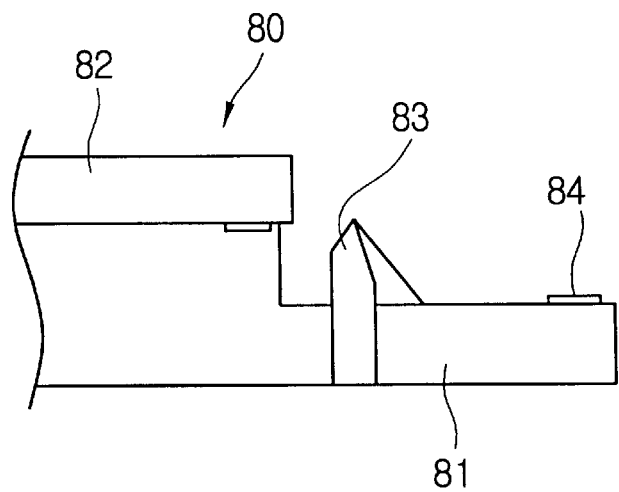
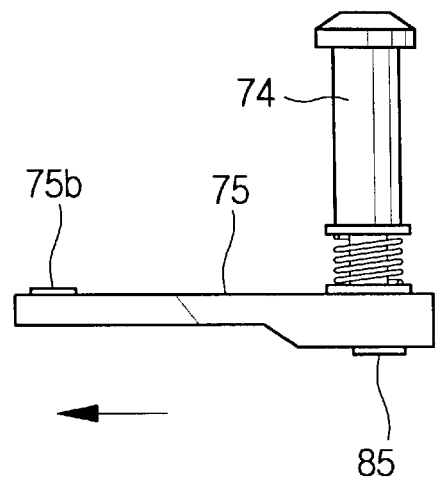
Fig. 16
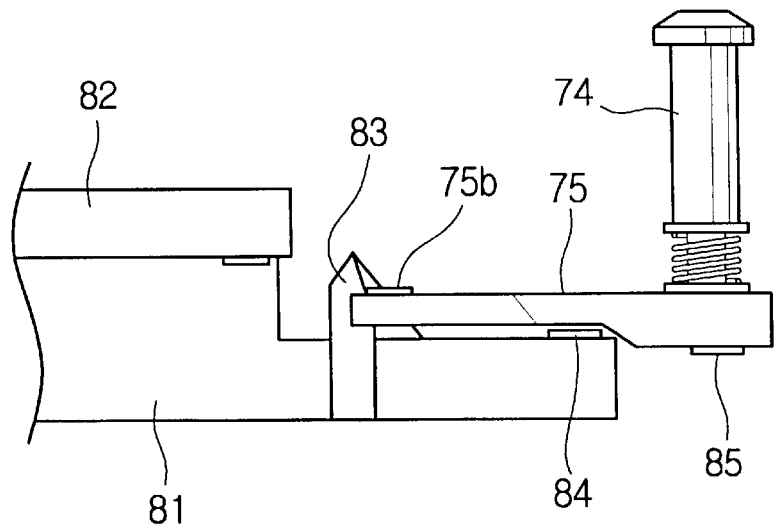

MAGNETIC RECORDING/REPRODUCING APPARATUS

BACKGROUND OF THE INVENTION

1. Field of the Invention

The present invention relates to a magnetic recording/reproducing apparatus and, more particularly, to a magnetic recording/reproducing apparatus in which power is selectively transferred to a running system or a loading system using only capstan motor.

2. Description of the Prior Art

Generally, almost all the magnetic recording/reproducing apparatus which is supplied for domestic use employs a ½ inch tape cassette.

The magnetic recording/reproducing apparatus comprises a cassette holder in which a tape cassette is mounted, driving members which pulls the cassette holder into a main body and mounts the cassette holder on a main deck, a loading/unloading device for loading or unloading a magnetic tape received in the tape cassette into/from a side of a rotary head drum, a tape guiding member for guiding the magnetic tape so that the magnetic tape is running along a predetermined passage.

If the tape cassette is inserted into a cassette entrance of the magnetic recording/reproducing apparatus, the tape cassette is accommodated in the cassette holder and the cassette holder is simultaneously mounted on the main deck. The magnetic tape is loaded to the side of the head drum rotating at a high speed by a supply and winding side pole base which is comprised in the tape loading/unloading device. And then, a signal is recorded on the magnetic tape or the recorded signal is reproduced.

Recently, a potable tape recorder with a video camera in which the above magnetic recording/reproducing apparatus is applied has been widely spread. In such magnetic recording/reproducing apparatus, there has been devoted an effort to reduce a size and weight of the apparatus in order to promote the convenience of a user.

Typically, the size of the deck is known as one of the main problems which exert an influence on the reducing of the size and weight of the magnetic recording/reproducing apparatus. Therefore, since it is a measure of technical level of a manufacturer to reduce the size and weight of the apparatus, various methods has been studied.

As one of the results of such research and development, there is proposed a Korean Patent Application No. 93-5016 by the applicant of this invention, entitled "Magnetic recording/reproducing apparatus and mode controlling method thereof".

In the magnetic recording/reproducing apparatus of the above application, a rotary drum is adapted to be accommodated in an inner space of a tape cassette when completing the loading operation of the tape cassette, thereby miniaturizing the size of a chassis. In addition, the apparatus is characterized that the loading and running operation of the magnetic tape is facilely achieved by a single driving source and each mode controlling operation is also facilitated without any separate device, thereby reducing a number of component parts thereof.

However, in the magnetic recording/reproducing apparatus as described above, a cam gear having a big size is mounted at both sides of a main chassis. There is also provided each member for respectively transferring power of a capstan motor to a running system and to a loading system. Further, the each member is provided with a plurality of gears. Therefore, there is a limit in reducing the size of the deck.

SUMMARY OF THE INVENTION

It is, therefore, an object of the present invention to provide a magnetic recording/reproducing apparatus of which the size of a deck mechanism is reduced almost as much as that of the tape cassette, thereby reducing the whole size of the apparatus and simplifying the construction thereof.

In accordance with the present invention, there is provided a magnetic recording/reproducing apparatus, comprising: a driving source; a main chassis on which the driving source is mounted; a sub chassis which is disposed to the main chassis so as to be slid in a front and rear direction, and which is provided with various tape running elements; a head drum device which is mounted on the main chassis; a loading system provided with a supply side pole base driving device and a winding side pole base driving device which loads a tape depending on the moving operation of the sub chassis in the front and rear direction; a running system which runs the tape in a desired direction at a desired speed; a main power transmitting means which selectively transmits a power of the power source to the loading system or the running system; a cam gear which is rotated by the main power transmitting means and transmits the power to each mode; a slider which is disposed between the main chassis and the sub chassis so as to be slid in a left and right direction and interlocked with the cam gear; a mode detecting means which detects each mode according to the tape running; a tape tension regulating means which applies a proper tension to the tape; an automatic separating means which automatically blocks a power transmission to the loading system in a particular mode; a connecting means which permits the power transmission to the loading system in a particular mode; and a connection maintaining means which maintains the power transmission at the time of loading/unloading the tape or in the early re-connection which transmits again the power to the loading system.

Preferably, the automatic separating means comprises a power transmitting means which transmits the power of the driving source to the cam gear, a rod moving lever which is rotatably coupled to one side of the main chassis and interlocked with the power transmission means, an elastic means which elastically supports the rod moving lever so that an elastic force is always exerted in one direction, a shift rotating member which is rotatably mounted on the other side of the main chassis and interlocks the rod moving lever depending on the rotation of the cam gear, and an elastic means which elastically supports the shift rotating member so that an elastic force is always exerted in one direction.

Preferably, the power transmitting means comprises a plurality of power transmission gears which are mounted between a central gear pulley and the cam gear, and a operational lever which supports a part of the power transmission gears and is connected to the rod moving lever.

Preferably, the power transmitting means comprises a third power transmission gear which is rotatably mounted on the main chassis and connected with the cam gear, a second power transmission gear which is engaged with the third power transmission gear, and a first power transmission gear which is coupled to an end of the operational lever rotatably coupled to a rotational center shaft of the second power transmission gear and which is selectively engaged with a central gear pulley.

Preferably, the rod moving lever is provided with a slot at one end thereof, a latching pin which is inserted into the slot of the rod moving lever is formed on an end of the operational lever so that the rod moving lever is interlocked by a rotating operation of the operational lever.

Preferably, the connecting means comprises a solenoid which is mounted on the rod moving lever, and a trans-latch which is rotatably mounted on the rod moving lever and interlocked with the shift rotating member and which is provided with an attachment portion magnetically attached to the solenoid.

Preferably, the shift rotating member comprises a first protrusion which is guided by a cam projection formed on an outer circumference of an upper face of the cam gear, a second protrusion which operates a latching portion of the trans-latch, a third protrusion which is guided by an operational pin formed in the outer circumference of the cam gear.

Preferably, the connection maintaining means comprises a guiding slot which is formed at the shift rotating member, and a latching portion which is formed at the rod moving lever and which is inserted into the guiding slot of the shift rotating member.

Preferably, the attachment portion is separately formed from the trans-latch, a supporting portion is formed on an end of a trans-latch, an upper guiding portion is formed on the supporting portion, a fixing hole is provided on an upper face of the upper guiding portion so that a fixing protrusion of the attachment portion is inserted into the fixing hole, and on an inner side of the upper guiding portion, there is provided a supporting projection having a desired height so as to be capable of being minutely rotated with the supporting projection in the center.

Preferably, the supply side pole base driving means comprises a supply side loading member which is rotatably coupled to a desired portion of the rear upper face of the sub chassis and which is interlocked by a loading operation of the sub chassis, and a supply side pole base which is rotatably mounted on an upper face of the sub chassis adjacent to the supply side loading member and in which a supply side guiding member is fixed at one side of the supply side pole base so as to be interlocked with the supply loading member.

Preferably, the supply side guiding member comprises a post shaft which is provided to be slant at a desired angle of inclination on the upper face of a supply side pole base, an elastic member and a lower flange and a pole sleeve which are provided on an outer face of the post shaft in order, a top post guiding member which is fixed to a protrusion formed on the upper face of the supply side pole base so as to support an upper portion of the post shaft and which is integrally provided with a spiral flange for guiding an upper portion of a tape, and a regulating member which is screwed from the upper side of the top post guiding member to an upper end of the post shaft so as to adjust a height of the post shaft, and wherein a spiral portion is formed in parallel with the tape running direction at a tape running portion of the spiral flange.

Preferably, the supply side pole base driving means comprises a guiding member which is provided with a lower guiding portion and an upper guiding portion apart form each other and which is mounted at the main chassis adjacent to a head drum device, side receiving means which are respectively formed on an upper face of each end of the supply side pole base and respectively supported on a lower face of the upper guiding portion when a loading operation is completed, a positioning means which is provided at one side of the lower guiding portion so that the supply side pole base can be positioned in a place, and a center receiving means which is provided at the other side of the lower guiding portion and on which a middle part of the lower face of the supply side pole base is supported when the loading operation is completed, and wherein the supply side pole base is supported by a three-point suspension method.

Preferably, the winding side pole base driving means comprises a first and second power transmitting means which is rotatably coupled to both sides of the sub chassis on the basis of a vertical center line of the sub chassis and interlocked with the slider, and a third power transmitting means which is interlocked with the second power transmitting means and of which one end is connected with a winding side pole base, the winding side pole base being moved along a winding side guide rail of the head drum.

Preferably, the first power transmitting means is provided with a latching portion which is inserted into a cam groove of a supply side loading arm, the latching portion of the slider is inserted into a guiding slot formed on the supply side loading arm so that a moving force of the slider is transmitted through the supply side loading arm to the first power transmitting means.

Preferably, the apparatus further comprises a torsion spring which is elastically supported to the supply side loading arm, wherein a part of the torsion spring is projected on a passage of the guiding slot so that the supply side loading arm is elastically supported in a particular mode according to the movement of the slider.

Preferably, the tape tension regulating means comprises a tension lever which is rotatably mounted to the sub chassis, a tension post which is provided on an upper face of the tension lever, a tension band which is connected with one side of the tension lever and which is wound around a circumference of a supply reel assembly, and a power relaying means which is interlocked with the supply side breaking means and which is provided with a first cam part and a second cam part which respectively have difference diameters so as to restrict a rotational angle of the tension lever.

Preferably, the tape tension regulating means comprises a tension lever which is rotatably mounted to the sub chassis, a tension post which is provided on an upper face of the tension lever, a tension band which is connected with one side of the tension lever and which is wound around a circumference of a supply reel assembly, and a power relaying means which is rotatably mounted on the sub chassis and is provided with the cam groove at one side thereof and which is provided with first and second cam parts at the other side thereof so as to restrict a rotational angle of the tension lever, wherein a connecting pin fixed to a desired portion of the slider is inserted into the cam groove, and the latching portion of the tension lever is located in the first and second cam parts.

Preferably, the running system comprises an idler power transmission controlling means which prevents a rotational force of an idler gear from transmitting to the supply reel assembly in a certain mode, wherein the idler power transmitting means comprises an idle plate which is rotatably mounted to a rotational center shaft of the central gear pulley, an idle gear which is rotatably coupled to the idle plate and which is selectively engaged with a reel gear of the supply reel assembly or a reel gear of the winding reel assembly depending on the rotational direction of the central gear pulley, a latching prior which is fixed to a desired portion of the slider, and an idler stopper which is rotatably mounted to a desired portion of the upper front side of the sub chassis so as to restrict the rotation of the idle plate, the central gear pulley being rotated by a capstan motor, and wherein the idler stopper comprises a shaft portion which is supported on the sub chassis, an operational portion which is selectively latched on the latching part of the slider, an elastic rib which has a certain elastic force, and a stopper latching part which is located on the idle plate.

Preferably, the mode detecting means comprises a cassette-in-switch which is mounted on the upper face of the sub chassis and which is turned on/off depending on an loading operation of a cassette housing, a ULS switch which is mounted at a side of the main chassis so as to be turned on/off by the movement of the sub chassis, a STOP switch which is mounted at a side of the main chassis and interlocked with the shift rotating member.

Preferably, the head drum device is a shaft fixed type in which is drum motor is respectively provided on a fixed shaft and an upper drum, a boss is fixed to an upper end of the fixed shaft, a disc shape back yoke is fixed to the boss, the back yoke is integrally formed with a tape guiding portion at one side of the circumference thereof, and the tape guiding portion stabilizes an entrance of the magnetic tape when the tape is loaded, and prevents the tape from being raised to the upper portion of the head drum.

Preferably, a distance from a reel hub of a tape cassette which is loaded on the sub chassis to a head contacting part of the head drum device is formed to be longer than a length of a lead tape which is respectively provided at both ends of the tape, whereby the lead tape L is not reached to the head contacting part, although the lead tape is completely loosed from the reel hub.

BRIEF DESCRIPTION OF THE DRAWINGS

The above and other objects and features of the present invention will become apparent from the following description of preferred embodiments when taken in conjunction with the accompanying drawings, in which:

FIGS. 1 and 2 show a ESP mode of a deck mechanism of a magnetic recording/reproducing apparatus according to the present invention, wherein FIG. 1 is a plan view showing a state that a sub chassis is combined and FIG. 2 is a plan view showing a state that the sub chassis is separated;

FIGS. 3 to 7 show each mode of a deck mechanism of the magnetic recording/reproducing apparatus according to the present invention, wherein FIG. 3 is a plan view showing a EJECT mode, FIG. 4 is a plan view showing a ULS mode, FIG. 5 is a plan view showing a STOP mode, FIG. 6 is a plan view showing a PB mode, FIG. 7 is a plan view showing the PB mode—the STOP mode;

FIGS. 8 and 9 show a construction and operation of a power transmission device of a loading system of the magnetic recording/reproducing apparatus according to the present invention, wherein FIG. 8 is a plan view showing a interlocking relationship of a shift rotating member when a cam gear is rotated and FIG. 9 is a partially cutaway perspective view showing a main construction of the cam gear;

FIGS. 14 to 17 show a construction and operation of a supply side pole base receiving device, wherein FIG. 14 is a perspective view, and FIGS. 15 to 17 are side view showing the operation of the supply side pole base receiving device in order;

FIGS. 18 to 22 show an embodiment of a supply side pole according to the present invention, wherein FIG. 18 is a plan view, FIG. 19 is a cross-sectional view along the line A—A, FIG. 20 is an exploded perspective view, FIG. 21 is an expanded view of FIG. 11, and FIG. 12 is a side view of a spiral flange;

FIGS. 23 to 28 show a construction and operation of the magnetic recording/reproducing apparatus according to the present invention, wherein FIG. 23 is a plan view of ESP mode, FIG. 24 is a plan view of EJECT mode, FIG. 25 is a plan view of ULS mode, FIG. 26 is a plan view of SL mode, FIG. 27 is a plan view of STOP mode, and FIG. 28 is a plan view of PB mode;

FIGS. 29 to 31 show other embodiment of a trans-latch according to the present invention, wherein FIG. 29 is an exploded perspective view, FIG. 20 is a plan view, FIG. 31 is a cross-sectional view taken along line B—B of FIG. 30;

FIGS. 32 and 33 show another embodiment of a trans-latch according to the present invention, wherein FIG. 32 is a plan view and FIG. 33 is a cross-sectional view taken along line C—C of FIG. 32;

FIGS. 36 and 38 show a construction and operation of an idler power transmission controlling device according to the present invention, wherein FIGS. 36 and 37 are plan views, and FIG. 38 is a perspective view;

FIGS. 39 and 41 show a mode detecting means according to the present invention, wherein FIG. 39 is a perspective view showing a STOP switch driving part, FIG. 41 is a block view of the mode detecting means;

FIGS. 44 to 46 show a feature of a running system of the magnetic recording/reproducing apparatus according to the present invention, wherein FIG. 44 is a bottom perspective view of a tape cassette, FIG. 45 is a cross-sectional view showing an inner construction of the tape cassette, and FIG. 46 is a view showing lead portions of both sides of the tape.

DETAILED DESCRIPTION OF THE PREFERRED EMBODIMENT

A preferred embodiment of the present invention will now be describe in detail with reference to the drawings.

Figure 1:
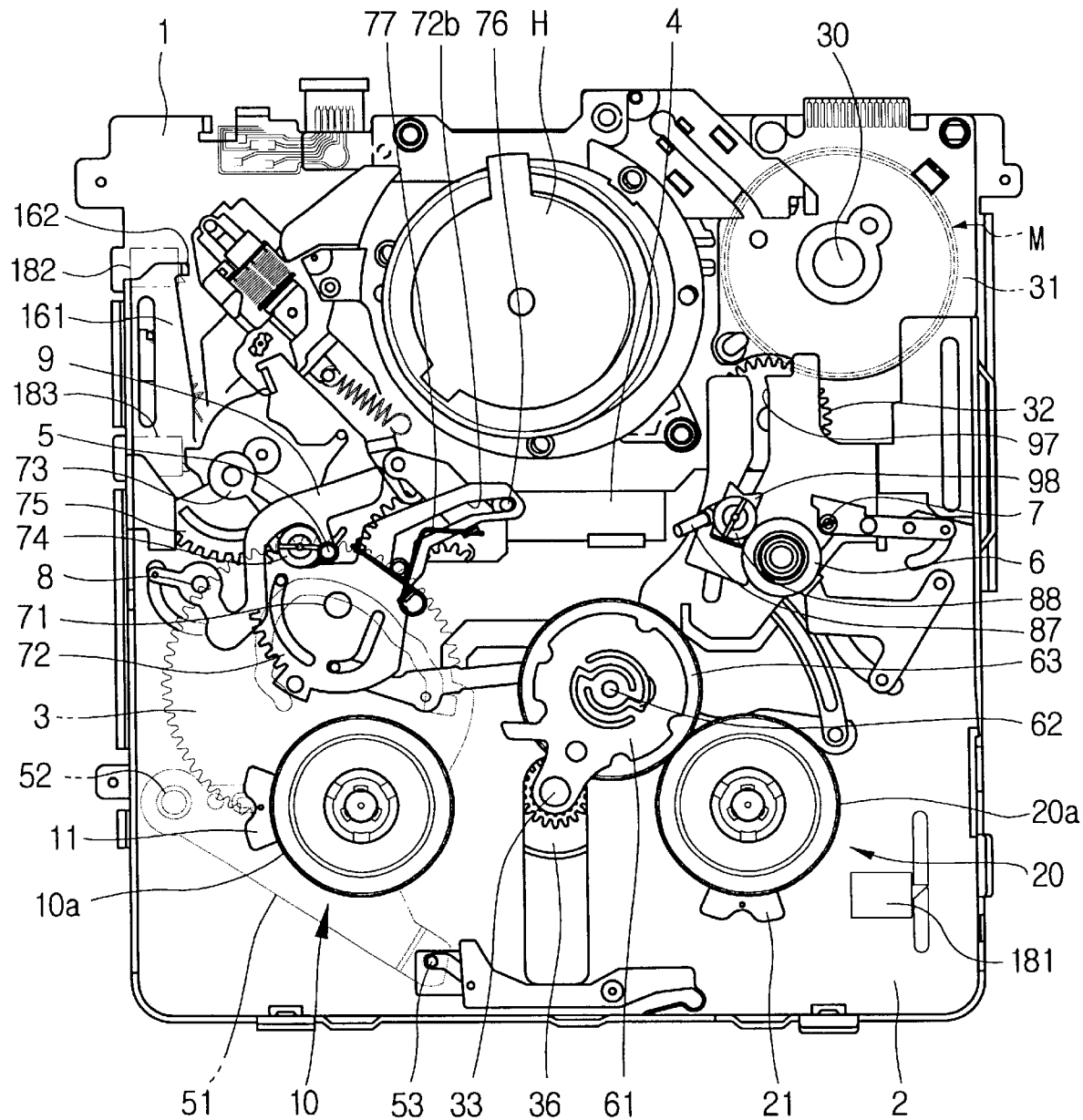
Figure 2:
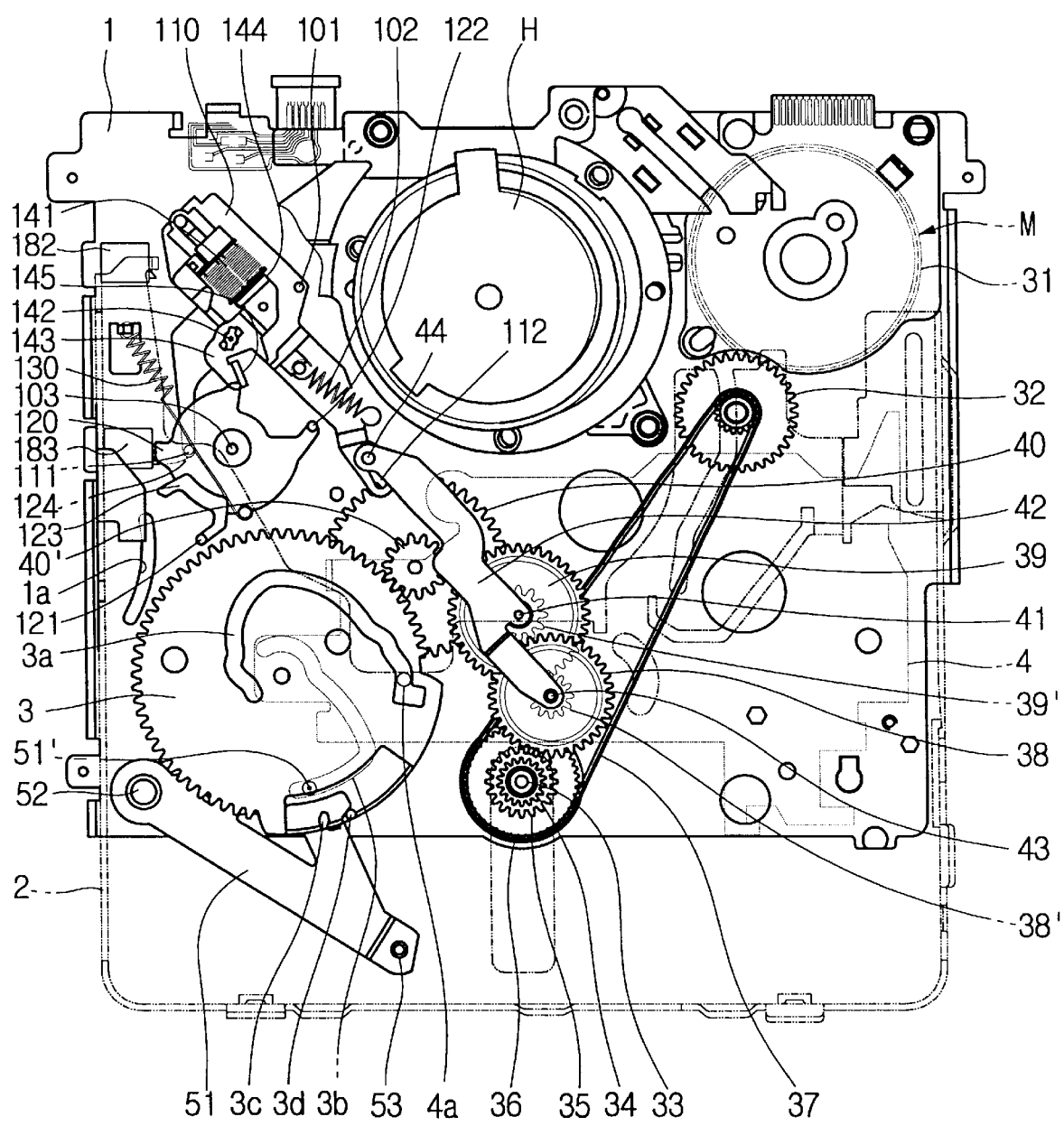

FIGS. 1 and 2 are plan views showing a ESP mode of a deck mechanism of a magnetic recording/reproducing apparatus according to the present invention, and FIGS. 3 to 7 are plan views showing each mode of a deck mechanism of the magnetic recording/reproducing apparatus according to the present invention.

A deck mechanism of a magnetic recording/reproducing apparatus according to the present invention selectively drives a running system or a loading system using a single power source, i.e. a capstan motor M. Here, the running system drives a reel of a tape cassette and the loading system moves a tape of the tape cassette along a running passage.

According to its technical construction and operation, the loading system can be divided into a supply side pole base driving means, a winding side pole base driving means which is interlocked with the supply side pole base driving means and a power transmission device of the loading system.

The construction of the deck mechanism of the magnetic recording/reproducing apparatus according to the present invention will be described more fully.

On an upper face of a plate type main chassis 1 having a size and thickness, a sub chassis 2, on which the tape cassette is disposed, is mounted to be capable of being linearly reciprocated along a desired displacement by a typical guiding means.

A space is maintained between the main chassis 1 and the sub chassis 2. A cam gear 3 is rotatably mounted at one side of the upper side of the main chassis 1, i.e. at a lower side of the sub chassis 2. At the other side of the upper face of the main chassis adjacent to the cam gear 3, there is provided a main power transmitting means for transmitting power of the capstan motor M to the cam gear 3. Further, on the upper face of the main chassis 1, there is provided a plate type slider 4 so as to be linearly moved along a desired displacement in a left or right direction by a rotation of the cam gear 3.

Mounted in the sub chassis 2 are the supply and winding side pole base driving means, supply and winding reel assemblies 10, 20 which are mounted at a space, supply and winding side braking means 11, 21 which provide a brake force to the supply and winding reel assemblies 10, 20, and a tape tension regulating means which controls the supply reel assembly 10 and adjusts a tension of the tape.

The main power transmitting means comprises a motor gear 31 of the capstan motor M, a driving gear pulley 32 which is rotatably mounted to a rear part of the upper face of the main chassis 1 and always engaged with the motor gear 31, a central gear pulley 36 which is rotatably mounted to a front middle part of the upper face of the main chassis 1 by a shaft pin 33 and integrally formed with upper and lower gears 34, 35 respectively having different diameters, a timing belt 37 which connects the driving gear pulley 32 with the central gear pulley 36, and a gear train for selectively transferring the rotational power of the central gear pulley 36 to the cam gear 3.

The gear train comprises a first power transmission gear 38 which is selectively engaged with the lower gear 35 of the central gear pulley 36 and integrally provided with a small gear 38' having a small diameter, a second power transmission gear 39 which is always engaged with the small gear 38' of the first power transmission gear 38 and integrally formed with a small gear 39', and a third power transmission gear 40 which is always engaged with the small gear 39' of the second power transmission gear 39 and integrally formed with a small gear 40' which is always engaged with the cam gear 3.

An operational lever 42 having a desired shape is rotatably coupled to a rotational center shaft 41 of the second power transmission gear 39. The first power transmission gear 38 is rotatably mounted to one end of the operational lever 42 by a shaft pin 43. Therefore, the transmitting of the rotational force of the central gear pulley 36 to the first power transmission gear 38 is permitted or blocked depending on the rotating operation of the operational lever 42.

The slider 4 is supported by a typical guiding means so as to be linearly movable in right and left directions. Since a cam pin 4a which is fixed to a desired portion of the slider 4 is inserted into a first cam groove 3a of the cam gear 3, the slider 4 can be moved to the right and left directions depending on the rotation of the cam gear 3.

In addition, an interlocking lever 51 is rotatably mounted at a front edge of an upper face of the main chassis 1 by a shaft pin 52. A latching pin 53 is fixed to an end of the interlocking lever 51 so that the interlocking lever 51 is connected with the sub chassis 2. A second cam pin 51' is fixed to a desired portion of the interlocking lever 51. The second cam pin 51' is inserted into a second cam groove 3b so that the interlocking lever 51 is interlocked depending on the rotation of the cam gear 3, thereby being capable of moving the sub chassis 2.

Meanwhile, the running system comprises an idle plate 61 which is rotatably mounted along with the central gear pulley 36 by the shaft pin 33 projected on the upper face of the sub chassis 2, an idle gear 63 which is rotatably coupled to the idle parts 61 by a shaft pin 62 and which is selectively engaged with a reel gear 10a of the supply reel assembly 10 or a reel gear 20a of the winding reel assembly 20 depending to the rotational direction of the central gear pulley 36, and an idler power transmission controlling means which prevents a rotational force of the idle gear 63 from transmitting to the supply reel assembly 10 in a certain mode.

Figure 12:
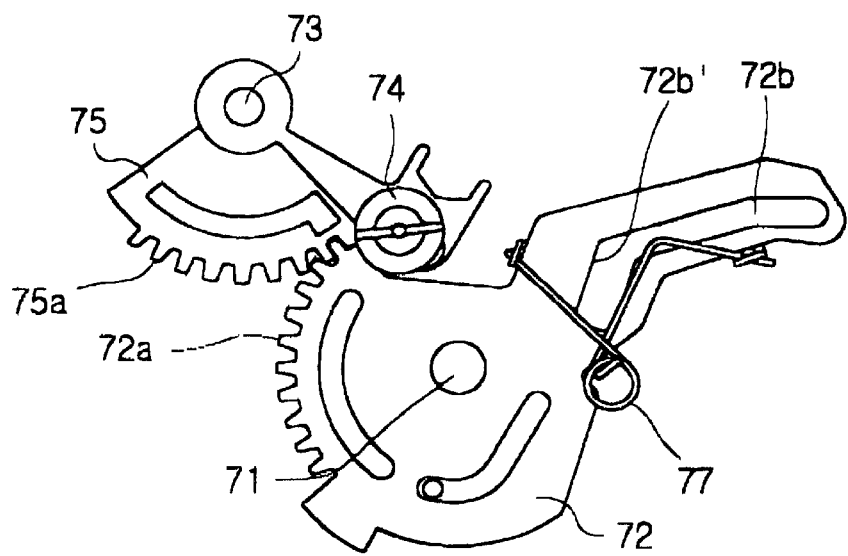
FIGS. 12 and 13 are plan views of a supply side pole base of the magnetic recording/reproducing apparatus according to the present invention.
Figure 13:
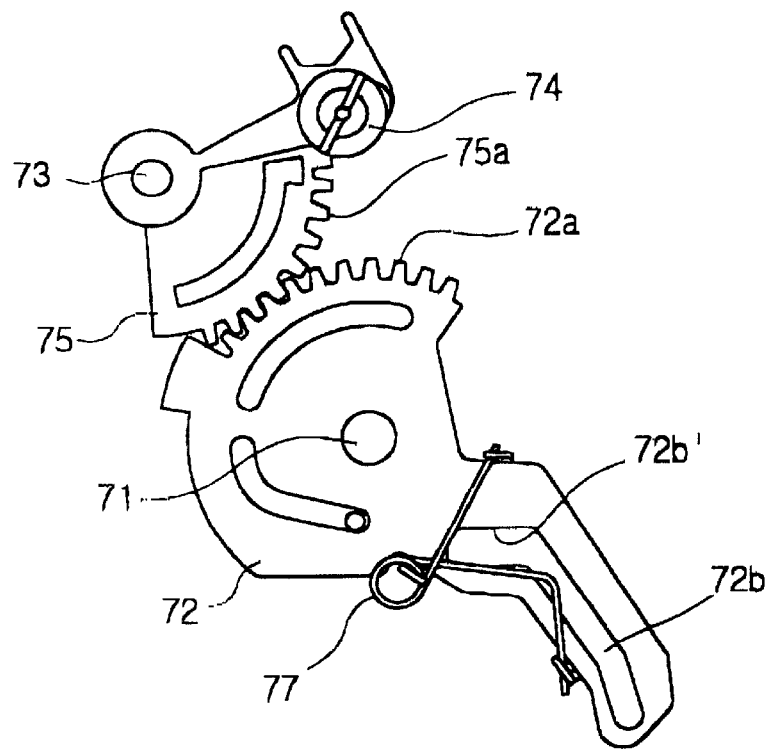
Figure 14:
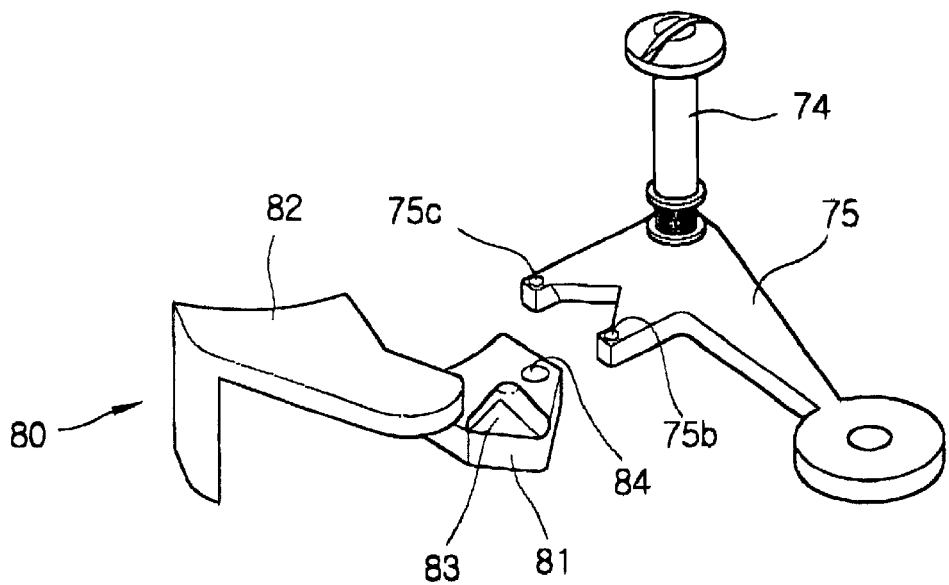

The supply side pole base driving means is a rotational lever type without any separate guide rail. As shown in FIGS. 12 and 13, the supply side pole base driving means comprises a supply side loading arm 72 which is rotatably coupled to a desired portion of the rear upper face of the sub chassis 2 by a shaft pin 71 and which is interlocked by a loading operation of the sub chassis 2, and a supply side pole base 75 which is rotatably mounted at a rear portion of the supply side loading arm 72 on the upper face of sub chassis 2 by a shaft pin 73 so as to be interlocked with the supply loading arm 72 and which a supply side pole 74 is fixed at one side thereof, and a three-point suspension type supply side pole base receiving means which safely supports the supply side pole base 75 in a tape loading state.

On each opposite side of the supply side loading arm 72 and the supply side pole base 75, there are formed gear portions 72a, 75a which are engaged each other.

A guiding slot 72b is formed at a side of the supply side loading arm 72. A latching pin 76, which is fixed to the upper face of the slider 4, is inserted in the guiding slot 72b. In an inner side of the guiding slot 72b, there is provided a fixing section 72b'.

A torsion spring 77 is elastically mounted to the supply side loading arm 72 so that a part of the torsion spring 77 is projected on a passage of the guiding slot 72b. Therefore, when the latching pin 76 is moved in the guiding slot 72b depending on the movement of the slider 4, an elastic force of the torsion spring 77 is exerted on the latching pin 76.

As shown in FIGS. 14 to 17, the supply side pole base receiving means comprises a guiding member 80 which is provided with a lower guiding portion 81 and an upper guiding portion 82 apart from each other and which is mounted at the main chassis 1 adjacent to a head drum device H, side protrusions 75b, 75c which are respectively formed on an upper face of each end of the supply side pole base 75 and respectively supported on a lower face of the upper guiding portion 82 when a loading operation is completed, a conical guiding protrusion 83 which is provided at one side of the lower guiding portion 81 so that the supply side pole base 75 can be positioned in a place, a center protrusion 84 which is provided at the other side of the lower guiding portion 81 and on which a middle part of the lower face of the supply side pole base 75 is supported when the loading operation is completed, and a supporting protrusion 85 which is formed at a middle part of the lower face of the supply side pole base 75 and contacted with the center protrusion 84.

Preferably, the supply side pole 74, which is applied in the supply side pole base, can serves as a existing guide roller and a slant pole. One embodiment having Such construction will be described more fully in below.

Figure 18:
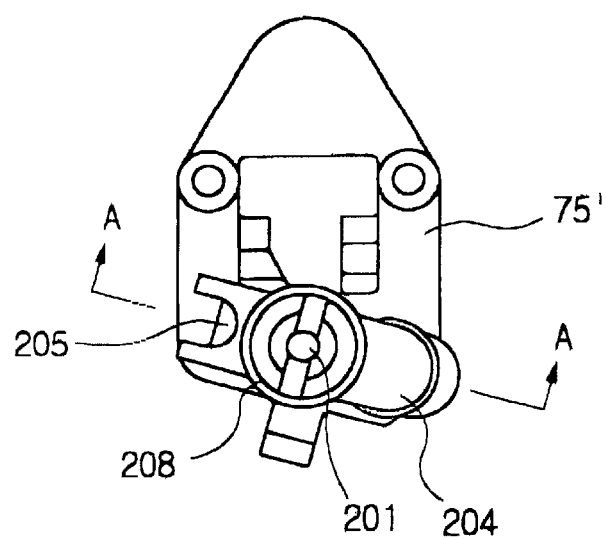
Figure 19:
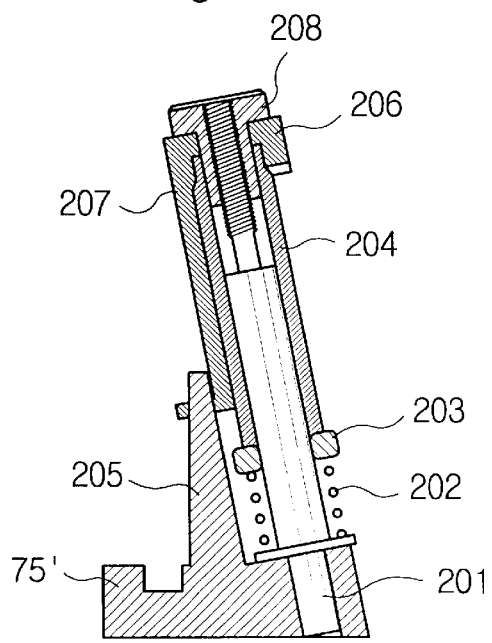
Figure 20:
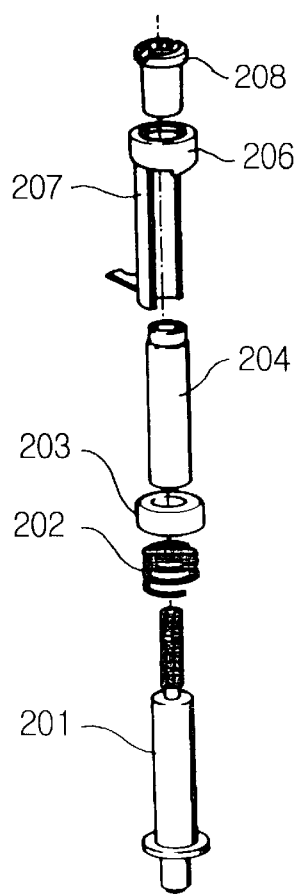

As shown in FIGS. 18 and 20, the supply side pole comprises a post shaft 201 which is provided to be slant at a desired angle of inclination on the upper face of a supply side pole base 75', an elastic member 202 and a lower flange 203 and a pole sleeve 204 which are provided on an outer face of the post shaft 201 in order, a top post guiding member 207 which is fixed to a protrusion 205 formed on the upper face of the supply side pole base 75' so as to support an upper portion of the post shaft 201 and which is integrally provided with a spiral flange 206 for guiding an upper portion of a tape, and a regulating member 208 which is screwed from the upper side of the top post guiding member 207 to an upper end of the post shaft 201 so as to adjust a height of the post shaft 201.

At a tape running portion of the spiral flange 206, a spiral portion 209 is formed in parallel with the tape running direction so that the tape is entered into the head drum device H at an incidence angle of 0°.

Figure 21:
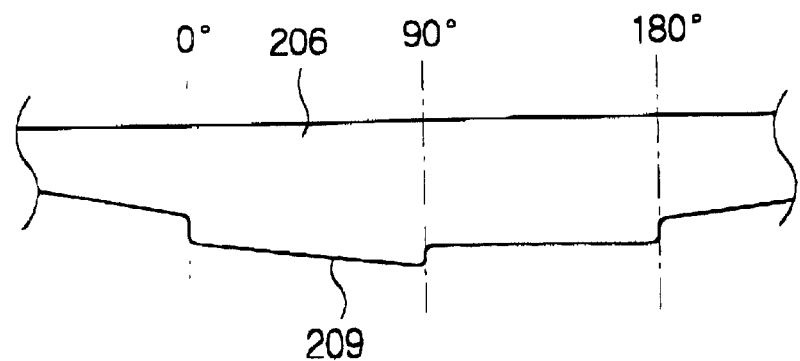
Figure 22:
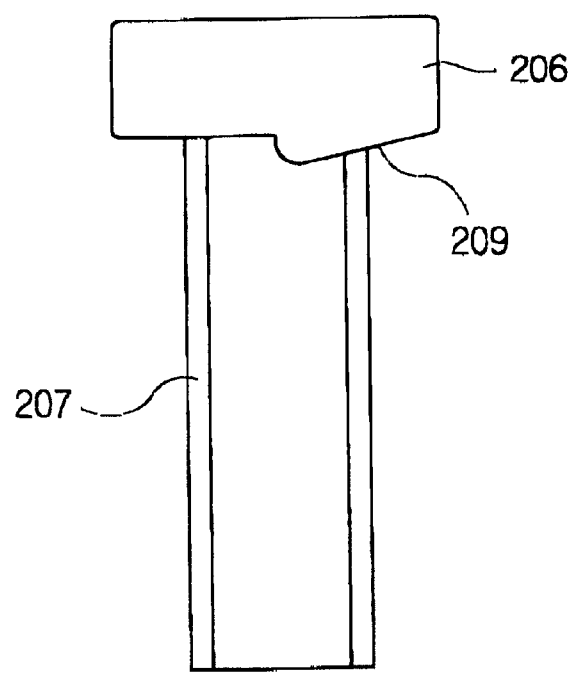

FIGS. 21 and 22 show a detailed construction of the top post guiding member. For example, it is preferable that a spiral section is formed over an extent of 0°–90° of the spiral flange 206 and a plane section is formed over an extent of 90°–180° of the spiral flange 206.

On the other hand, as shown in FIGS. 23 to 28, the winding side pole base driving means comprises a connecting lever 93 and a intermediate lever 94 which are rotatably mounted on the upper face by each shaft pin 91, 92 so as to interlocking with each other, a winding side loading arm 95 which is interlocked with the intermediate arm 94, and a winding side pole base 98 which is connected through a connecting pin 96 with the winding side loading arm 95 and which is moved along a guide rail 97 on the sub chassis 2.

At one end of the connecting lever 93, there is fixed a latching pin 93a which is simultaneously inserted into a guiding slot 72C formed on the supply side loading arm 72. At the other end of the connecting lever 93, there is also fixed a latching pin 93b. Furthermore, at one end of the intermediate lever 94, there is formed a latching groove 94a in which the latching pin 93a is inserted. The other end of the intermediate lever 94 is connected to the winding side loading arm 95 by the connecting pin 99. A slant post 87 and a guide roller 88 is provided on the upper face of the winding side pole base 98 which is connected to the winding side loading arm 95 by the connecting pin 96.

The intermediate lever 94 is formed with a latching pin 94b at a desired portion thereof. A cam groove 4b for guiding the latching pin 94b is formed on the slider 4 so that the intermediate lever 94 can be rotated depending on the movement of the slider 4.

The reference numeral 97' indicates a guide rail.

Meanwhile, the power transmission device of the loading system is a main construction of the magnetic recording/reproducing apparatus according to the present invention. The power transmission device of the loading system comprises an automatic separating means for automatically blocking a power transmission passage to the loading system in a desired mode, a connecting means which use a latch for permitting the power transmission to the loading system, and a connection maintaining means which maintains the power transmission at the time of loading/unloading the tape or in the early re-connection which transmits again the power to the loading system.

That is, as shown in FIG. 2, the automatic separating means comprises a rod moving lever 110 which is rotatably coupled to a desired portion of the upper face of the main chassis 1 and interlocked with the power transmission means for transmitting the power of the capstan motor M to the cam gear 3, an elastic means 102 which elastically supports the rod moving lever 110 so that the elastic force is always exerted in one direction, a shift rotating member 120 which is rotatably mounted on the upper face of the main chassis 1 between the cam gear 3 and the rod moving lever 110 by a shaft pin 103 and interlocks the rod moving lever 110 depending on the rotation of the cam gear 3, and an elastic means 130 which elastically supports the shift rotating member 120 so that the elastic force is always exerted in one direction.

The connecting means comprises a solenoid 141 which is mounted on one side of an upper face of the rod moving lever 110, a trans-latch 143 which is rotatably mounted on the other side of the upper face of the rod moving lever 110 by a shaft pin 142 and interlocked with the shift rotating means 120.

At one end of the trans-latch 143, there is provided a attachment portion 144 on which one side of the solenoid 141 is magnetically attached. At the other end of the trans-latch 143, there is provided a latching portion 145 which is contacted with a part of the shift rotating member 120.

Figure 11:
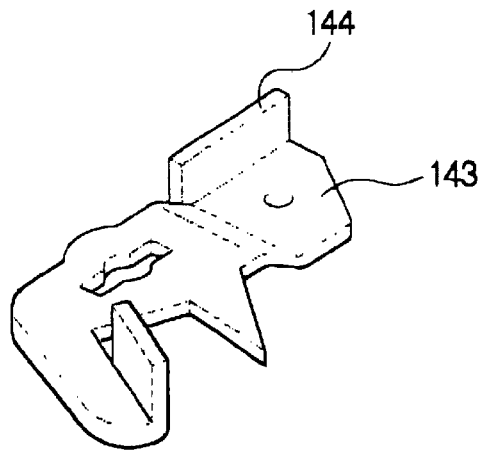
FIG. 11 is a perspective view showing one embodiment of a trans-latch of the power transmission device of the loading system according to the present invention.

FIG. 11 is a perspective view showing an embodiment of the trans-latch 143.

The attachment portion of the trans-latch 143 is separately formed from the trans-latch 143 so as to be capable of freely moving to some extent. Therefore, the magnetical attaching operation between the solenoid 141 and the attachment portion 141 is stabilized.

Figure 29:
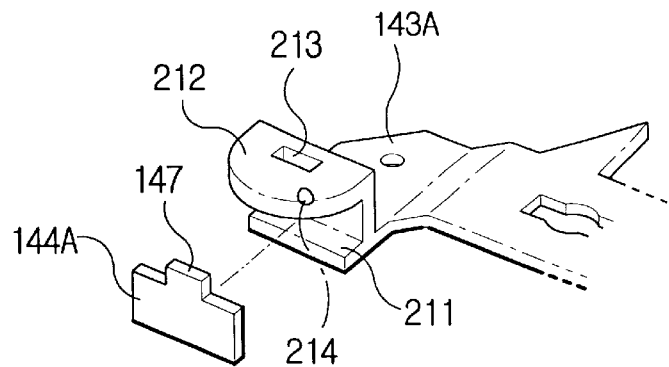
Figure 30:
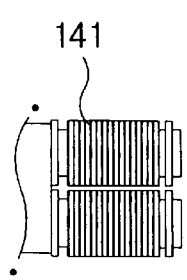
Figure 30A:
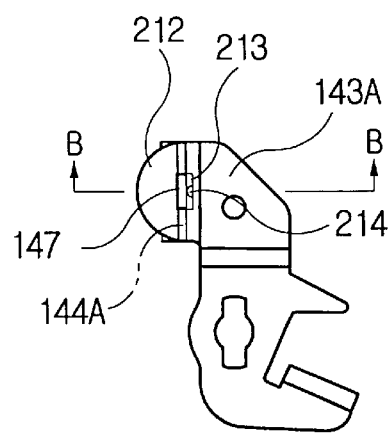
Figure 31:
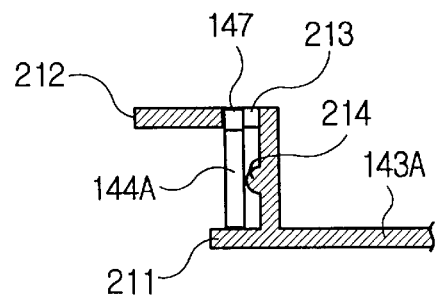

For example, as shown in FIGS. 29 to 31, a supporting portion 211 is formed on an end of a trans-latch 143A. An upper guiding portion 212 is formed on the supporting portion 211. On the upper face of the upper guiding portion 212, there is provided a fixing hole 213 so that a fixing protrusion 147 of the attachment portion 144A is inserted into the fixing hole 213. And on an inner side of the upper guiding portion 212, there is provided a supporting projection 214 having a desired height so as to be capable of being minutely rotated with the supporting projection 214 in the center.

Figure 32:
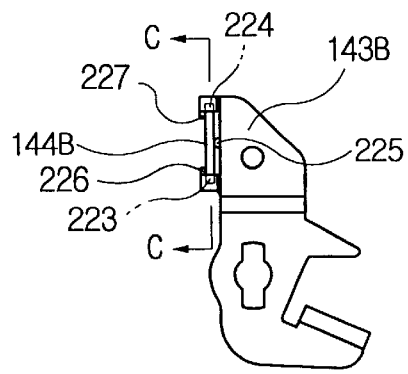
Figure 33:
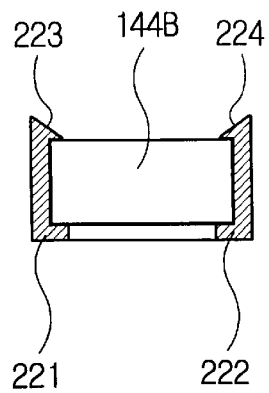

In another embodiment as shown in FIGS. 32 and 33, supporting portions 221, 222 are respectively formed at both sides of an end of a trans-latch 143B. On the upper end of each supporting portion 221, 222, there are respectively provided connecting hooks 223, 224 so that the attachment portion 144B is coupled with the connecting hooks 223, 224 by softly pressing the attachment portion 144B from upper side or the service of the ground device without a lot of time and endeavor. And on a side of the trans-latch 143, there is provided a supporting projection 225 having a desired height so as to be capable of being minutely rotated with the supporting projection 225 in the center.

The attachment portion 144B is supported by a latching projections 226, 227 adjacent to the supporting portions 221, 222 or connecting hooks 223, 224 so as to prevent from arbitrarily removing.

The shift rotating member 120 comprises a first protrusion 121 which is guided by a cam projection 3c, a second protrusion 122 which operates the latching portion 145 of the trans-latch 143, a third protrusion 123 which is guided by an operational pin 3d formed in an outer circumference of the cam gear 3.

Further, the connection maintaining means maintains the engaging state of the central gear pulley 36 and the first power transmission gear 38 at the time of loading/unloading the tape or in the early re-connection.

That is, on a lower face of the shift rotating member 120, there is formed a guiding groove 124 for maintaining the engaging state of the central gear pulley 36 and the first power transmission gear 38 at the time of loading/unloading the tape at the time of loading/unloading the tape. And on a circumference of the rod moving lever 110, there is formed a latching pin 111 which is guided to the guiding groove 124 so as to control the rotational operation of the rod moving lever 110 depending on a location of the latching pin 111.

The guiding groove 124 is formed so that the latching pin 111 is taken off and the rod moving lever 110 is freely rotated when the power to the loading system is disconnected in a desired mode.

In addition, in the early re-connection, a separate connection maintaining mechanism is not necessary. There is provided a hinge point in a proper position to make better use of a load according to the rotations of the first, second and third power transmission gears 38, 39, 40, thereby smoothly achieving the connection in the early re-connection.

Figure 10:
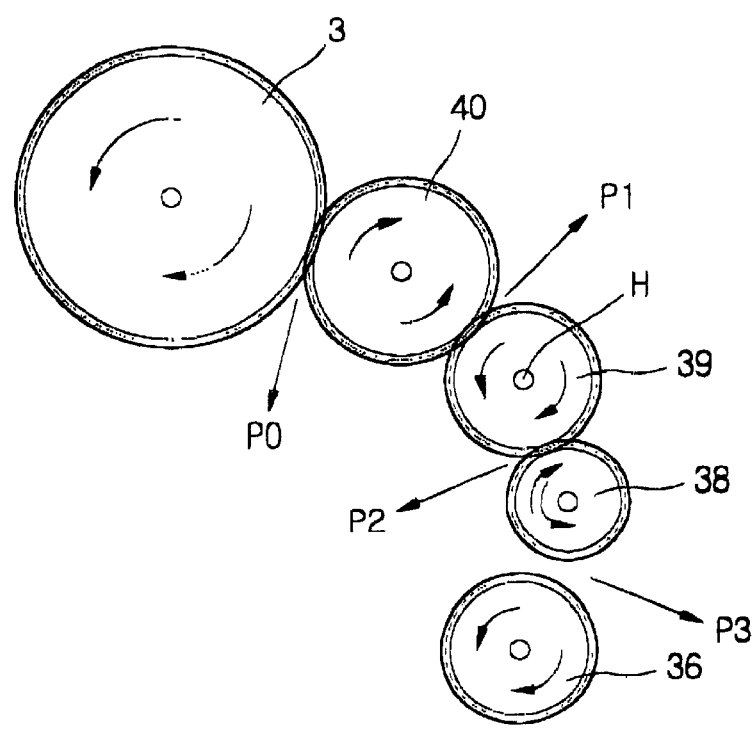
FIG. 10 is a plan view to show a connection maintaining operation of the power transmission device of the loading system according to the present invention.

In one embodiment of the present invention, as shown in FIG. 10, the cam gear 3 is engaged with the third power transmission gear 40. The operational lever 42 is rotatably mounted to the rotational center shaft 41 of the second power transmission gear 39 which is engaged with the third power transmission gear 40. The rotational center shaft 41 is the hinge point H. The first power transmission gear 38 is rotatably mounted at one end of the operational lever 42 so that the first power transmission gear 38 is engaged with the central gear pulley 36 according to the rotational operation of the operational lever 42.

Here, the connecting relationship between the power transmitting means and the rod moving lever 110 is described more fully. A slot 112 is formed at one end of the rod moving lever 110. A latching pin 44, which is inserted into the slot 112, is formed at the end of the operational lever 42 comprises of the power transmitting means so that the rod moving lever 110 is interlocked by the rotating operation of the operational lever 42.

Figure 34:
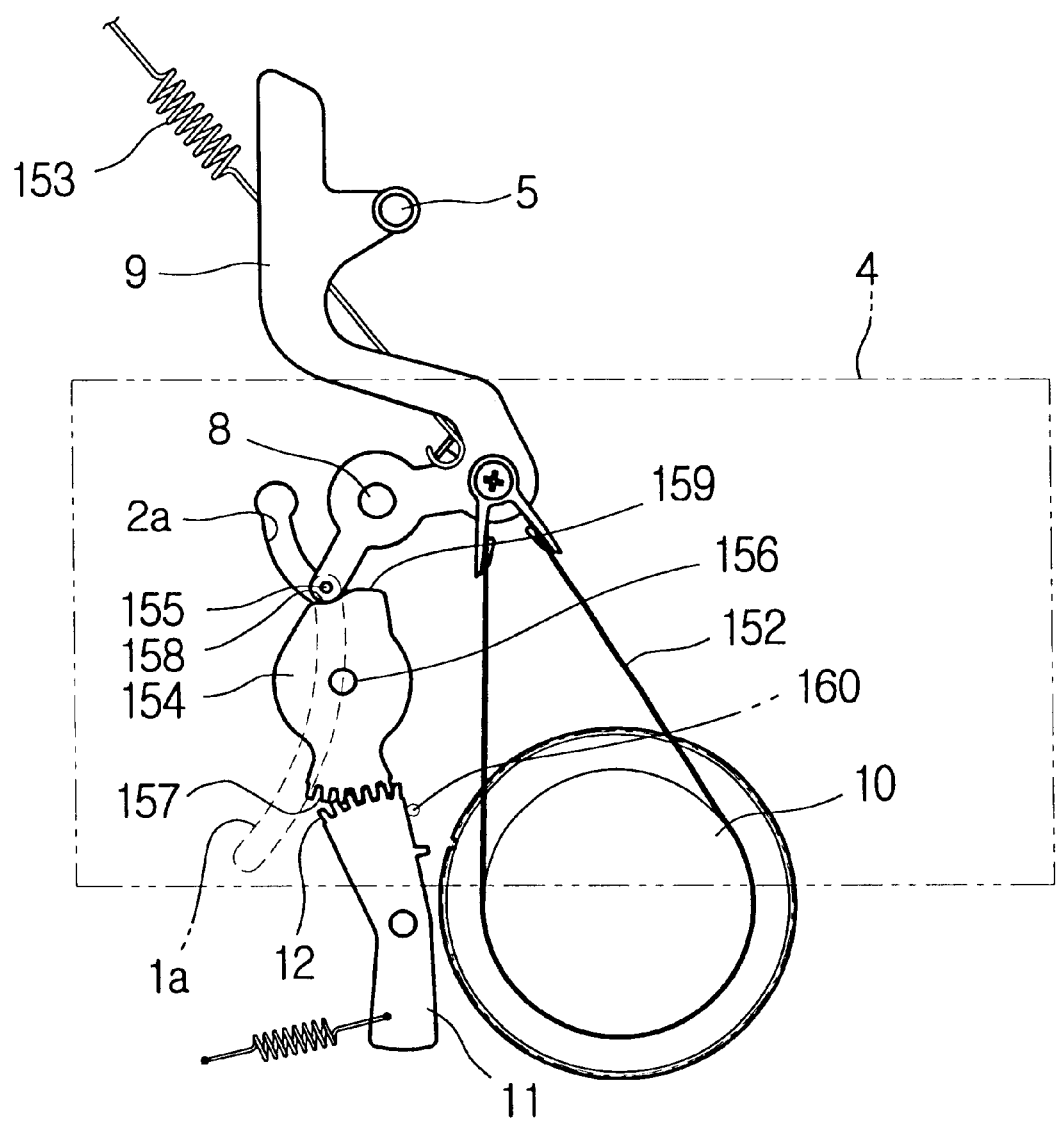
FIGS. 34 and 35 are plan views showing a construction and operation of a tension regulating device according to the present invention.
Figure 35:
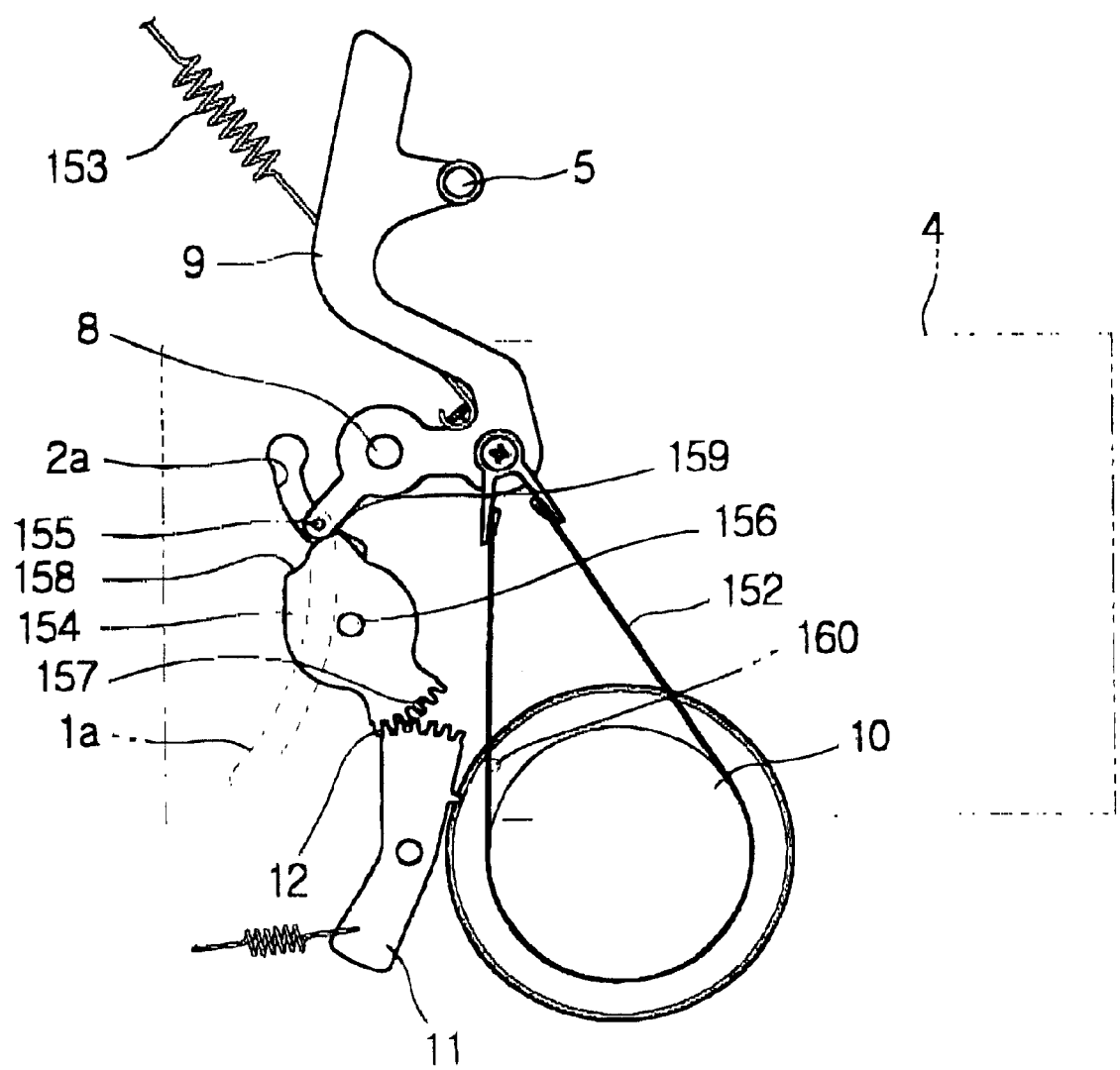

As shown in FIGS. 34 and 35, the tape tension regulating means comprises a tension lever 9 which is mounted to the desired portion of the sub chassis 2 so as to be rotated with the shaft pin 8 in the center and which the tension post 5 is provided on the one end of the upper face thereof, a tension band 152 which is connected with one side of the tension lever 9 and which is wound around the circumference of the supply reel assembly 10, an elastic means 153 by which the tension lever 9 is pressed in one direction, and a power relaying means 154 which interlocks the supply side braking means 11 according to the movement of the slider 4 so as to properly control a position of the tension lever 9.

The tension lever 9 is provided with a latching pin 155 which is fixed to an end of the lower face of the tension lever 9. The latching pin 155 is guided to be rotated by the guiding slot 2a of the sub chassis 2 and the cam groove 1a of the main chassis 1.

The power relaying means 154 is mounted on the sub chassis 2 between the supply side braking means 11 and the tension lever 9 so as to transmit a moving force of the supply side braking means 11 to the tension lever 9, thereby controlling the rotational operation of the tension lever 9. The power relaying means 154 is rotatably mounted to a desired position of the sub chassis 2 by a shaft pin 156.

At one end of the upper relaying means 154, there is provided with a gear part 157 which is engaged with a gear part 12 of the supply side braking means 11. At the other end of the power relaying means 154, there are provided with a first cam part 158 and a second cam part 159 on which the latching pin 155 of the tension lever 9 is latched and which respectively have different diameters. Therefore, the rotational operation of the tension lever 9 can be controlled depending on a rotary angle of the power relaying means 154.

The supply side braking means 11 is rotated by a latching part 160 which is fixed to a desired portion of the slider 4.

Figure 36:
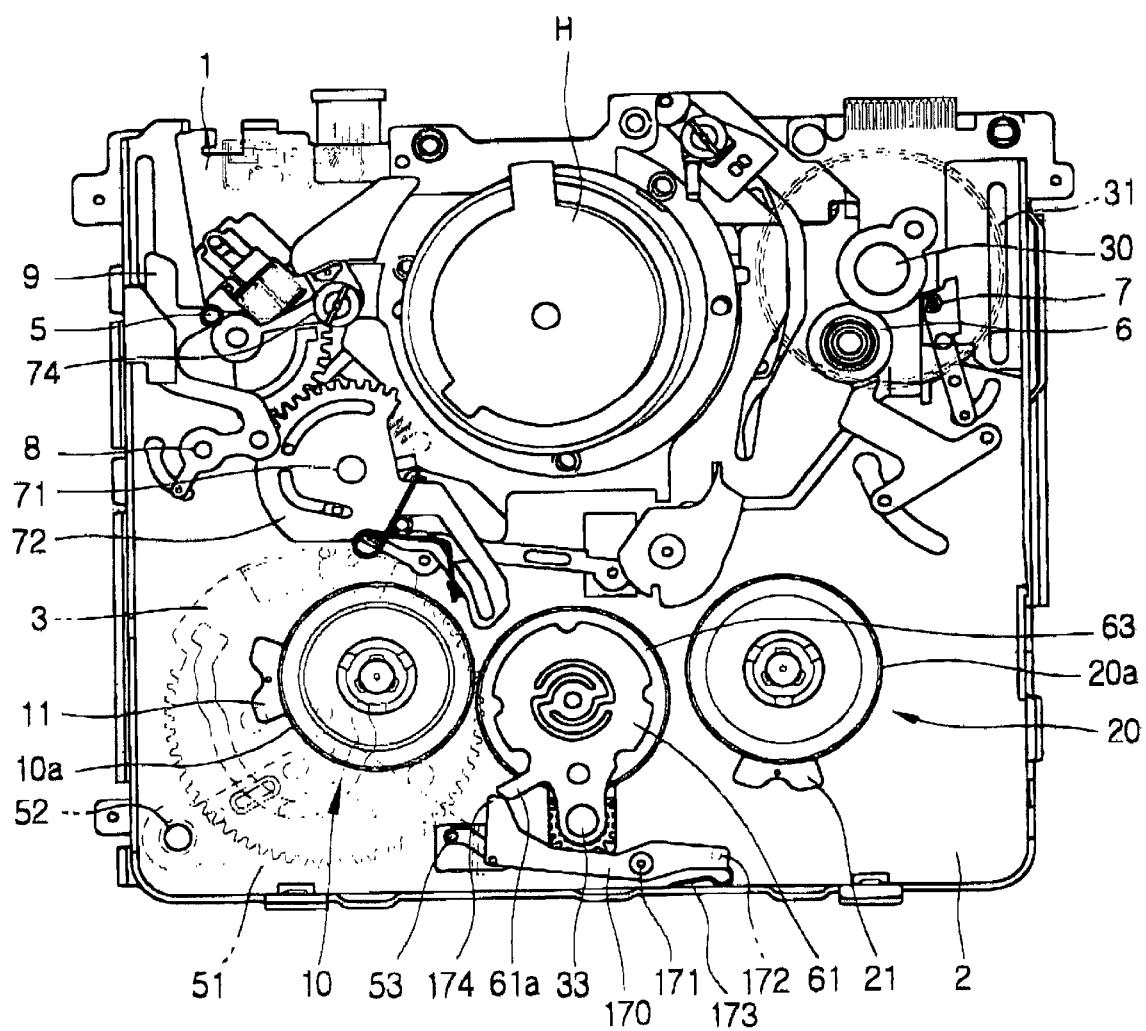
Figure 37:
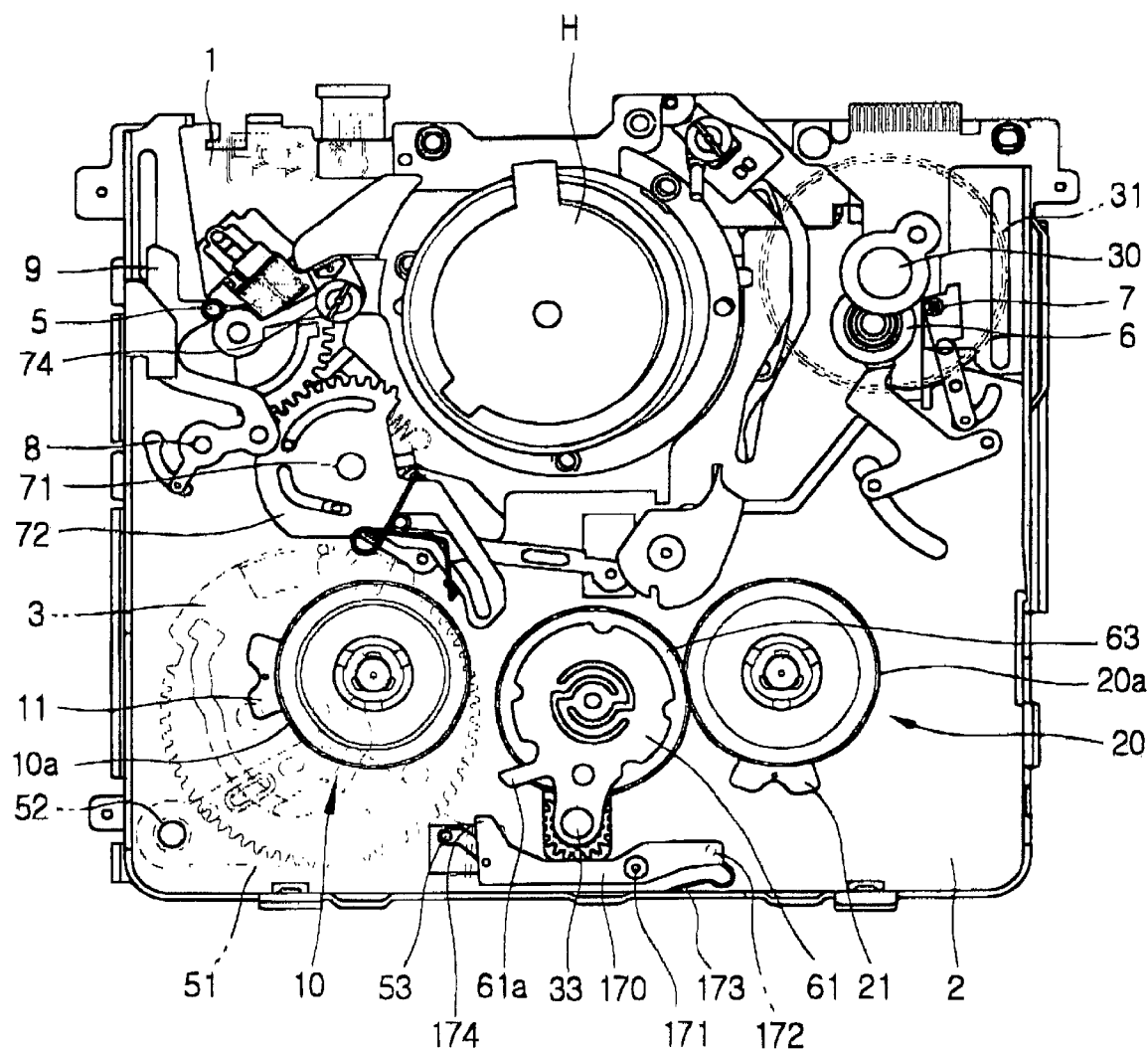

Meanwhile, as shown in FIGS. 36 and 37, the idler power transmitting means comprises a latching part 4c which is fixed to a desired portion of the slider 4, and an idler stopper 170 which is rotatably mounted to a desired portion of the upper front side of the sub chassis 2 so as to control the rotation of the idle plate 61.

The idler stopper 170 comprises a shaft portion 171 which is supported on the sub chassis 2, an operational portion 172 which is downwardly extended through the guiding slot 2b of the sub chassis 2 so at to be selectively latched on the latching part 4c of the slider 4, an elastic rib 173 which has a certain elastic force, and a stopper latching part 174 which is latched on an idle latching part 61a of the idle plate 61.

The magnetic recording/reproducing apparatus according to the present invention as described above is provided with a mode detecting means for detecting each mode. One embodiment thereof will be described more fully.

First, a mode detecting method according to the present invention comprises a step of detecting a standard mode using a typical foot switch of which an on/off operation is controlled by a physical pushing operation, a step of counting FG of the capstan motor M on the basis of a signal of the standard mode, a step of calculating the FG counted value of the capstan motor M and the signal of the standard mode in a micro-computer and detecting the remaining modes.

Figure 39:
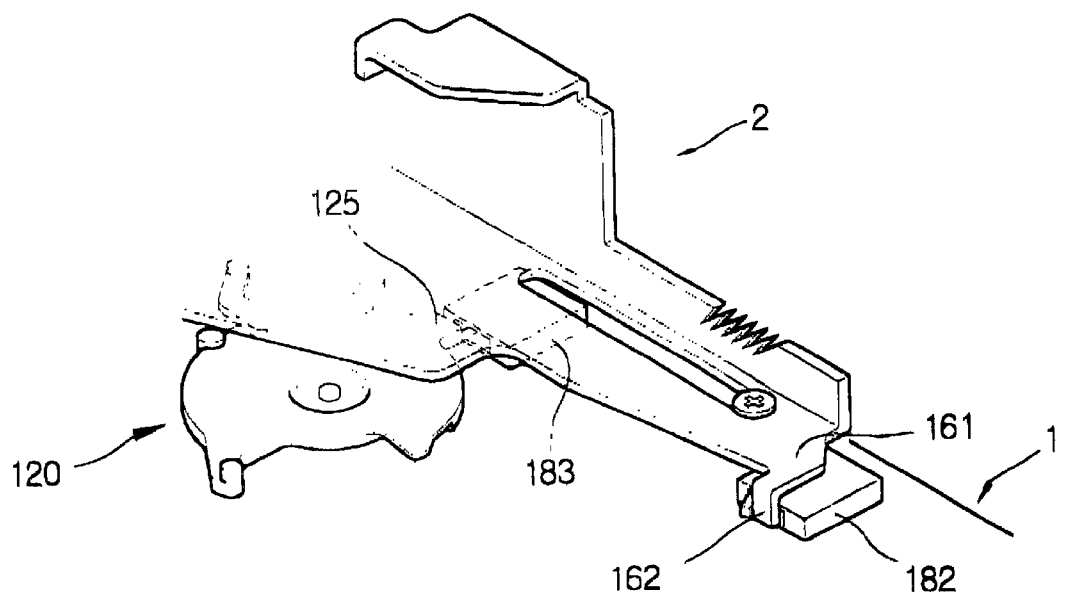
Figure 40:
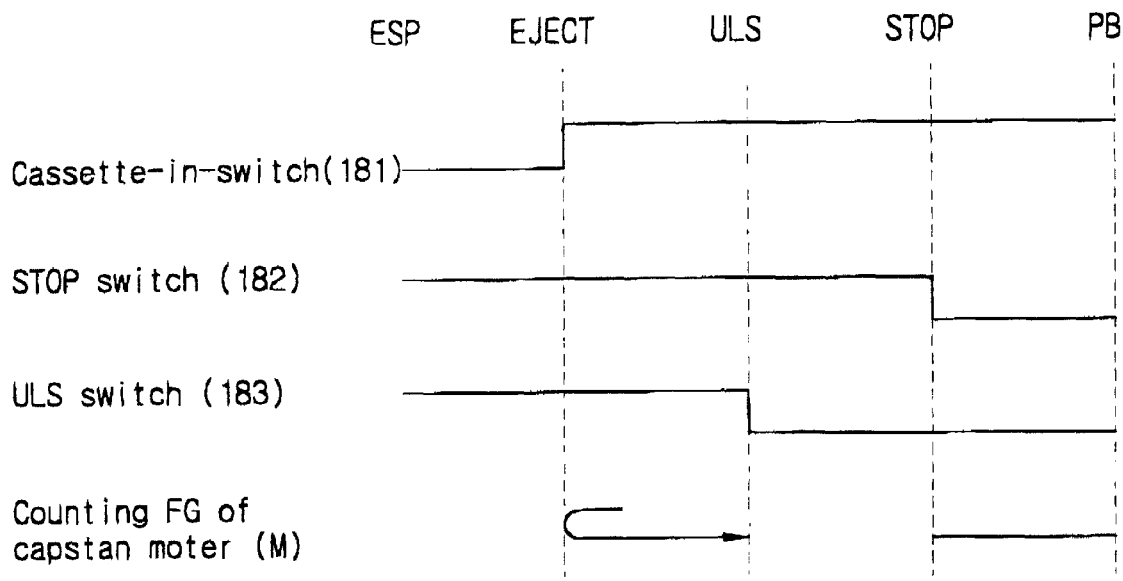
FIG. 40 is a view showing a each mode state.
Figure 41:
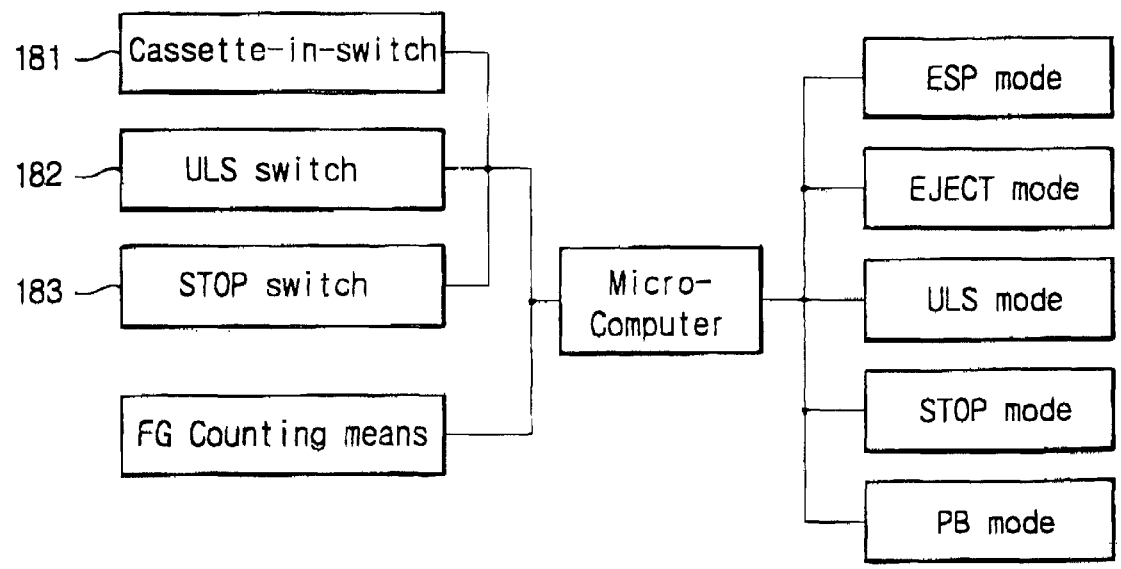

A mode detecting device, in which the above mode detecting method is embodied, as shown in FIGS. 39 to 41, comprises a cassette-in-switch 181 (FIG. 1) which is mounted on the upper face of the sub chassis 2 and which is turned on/off depending on an loading operation of a cassette housing (not shown), a ULS switch 182 which is mounted at a side of the main chassis 1 so as to be turned on/off by the movement of the sub chassis 2, a STOP switch 183 which is mounted at a side of the main chassis 1 and interlocked with the power transmission device of the loading system.

The cassette-in-switch 181, ULS switch 182 and STOP switch 183 which are employed in the present invention are typical normal switches having a same shape.

The cassette-in-switch 181 is the same as that which is used in the existing magnetic recording/reproducing apparatus. That is, the cassette-in-switch 181 is turned off in ESP and EJECT modes, and is turned on from the time that the cassette housing is accommodated in the sub chassis 2 to PB mode.

The ULS switch 182 is operated by a pushing piece 162 which is formed at an end of a guiding member 161. The guiding member 161 is formed at a edge of the sub chassis 2.

As shown in FIGS. 1 to 4, since the sub chassis 2 is ejected in the ESP and EJECT modes, the ULS switch 182 is turned on. And, as described above, if the sub chassis 2 is started to move and the pushing piece 162 formed on the guiding member 161 of the sub chassis 2 is get off the ULS switch 182, the ULS switch 182 is turned off.

When a power source is disconnected or a new battery is inserted into the magnetic recording/reproducing apparatus, the ULS switch 182 is also used for initializing the apparatus.

In addition, the STOP switch 183 is turned on, when being pushed by a switch operating part 125 formed at an outer circumference of the shift rotating member 120.

That is, in the ESP, EJECT, ULS and STOP modes, the STOP switch 183 is pushed by the switch operating part 125 and is turned on. In the PB mode, the shift rotating member 120 is rotated in the clockwise direction and got off from the STOP switch 183, thereby being turned off.

Meanwhile, the magnetic recording/reproducing apparatus according to the present invention employs a shaft-fixed-type head drum device H. The tape loading operation is guided using parts of the shaft-fixed-type head drum device H.

Figure 42:
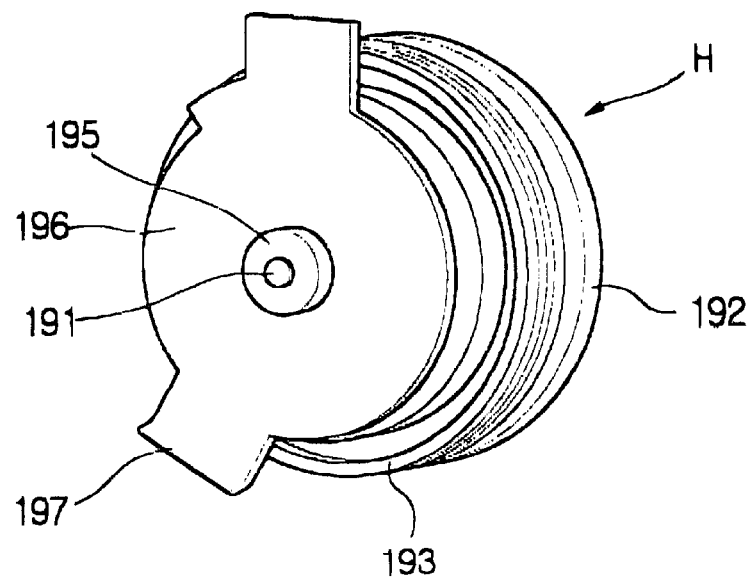
FIGS. 42 and 43 are a perspective view and a side view showing a tape guiding device according to the present invention.
Figure 43:
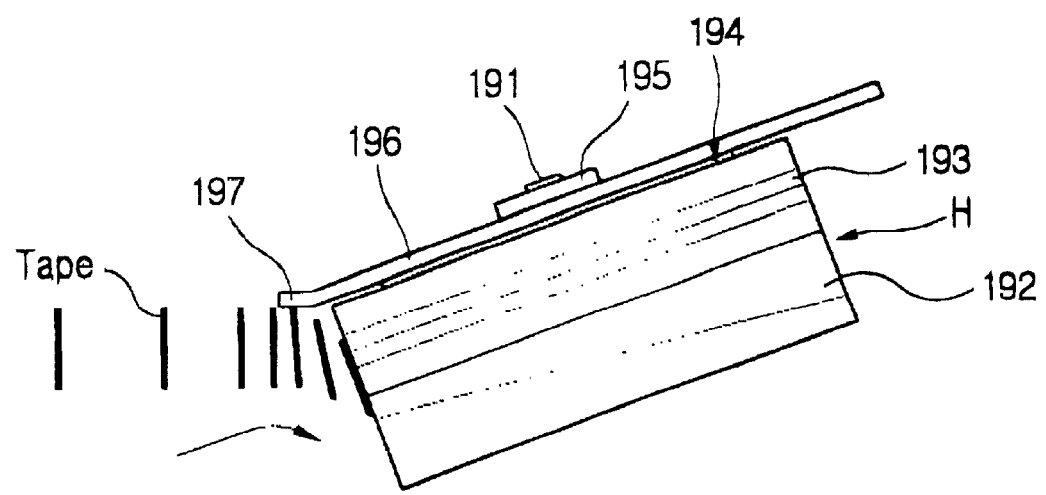

As shown in FIGS. 42 and 43, a lower drum 192 is fixed to a lower portion of a fixed shaft 191. An upper drum is rotatably mounted via a bearing (not shown) on an upper portion of the fixed shaft 191. On the upper portion of the fixed shaft and an upper face of the upper drum 193, there is provided a typical drum motor 194.

In the shaft-fixed-type head drum device H as described above, a boss 195 is fixed to the upper portion of the fixed shaft 191. A disc shape back yoke 196 is fixed to the boss 195. The back yoke 196 is internally formed with a tape guiding portion 197 at one side of the circumference thereof. The tape guiding portion 197 stabilizes an entrance of the magnetic tape when the tape is loaded, and prevents the magnetic tape from being raised to the upper portion of the head drum.

Preferably, the tape guiding portion 197 is formed to be inclined at a desired angle in order to stabilize the entrance of the tape.

Figure 44:
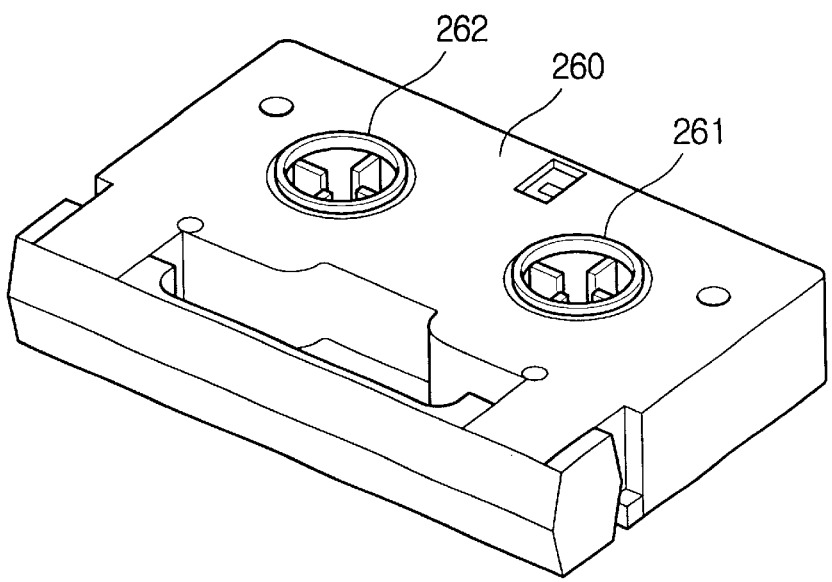
Figure 45:
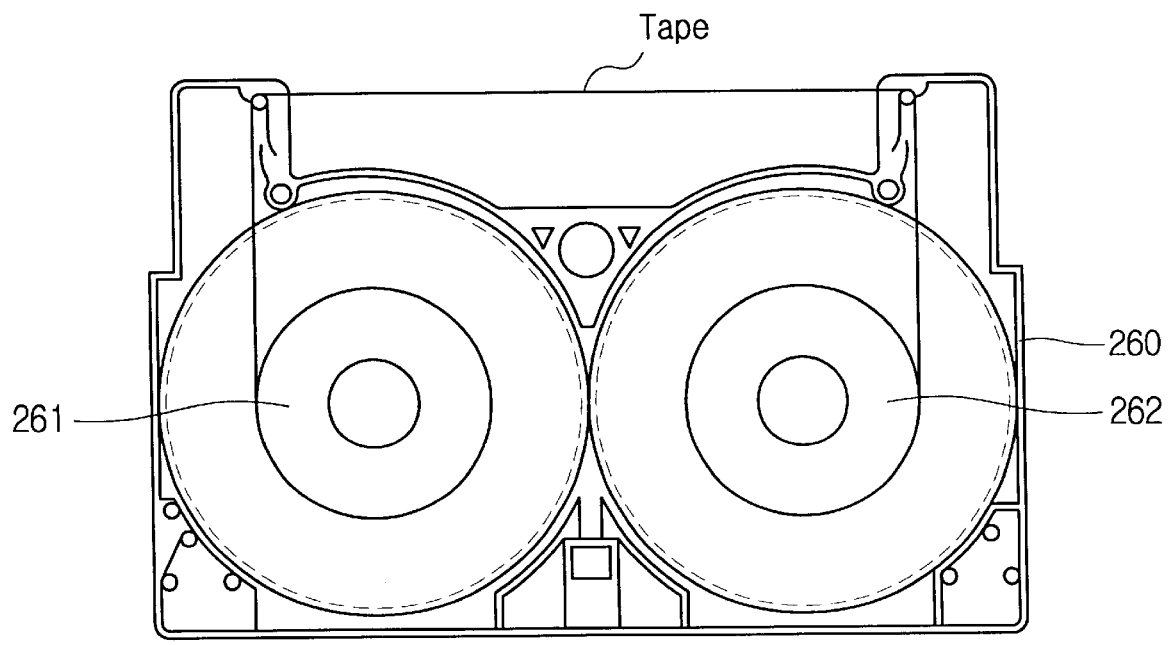
Figure 46:
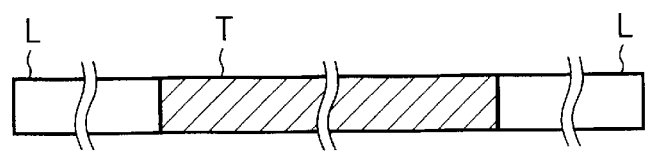
Figure 47:
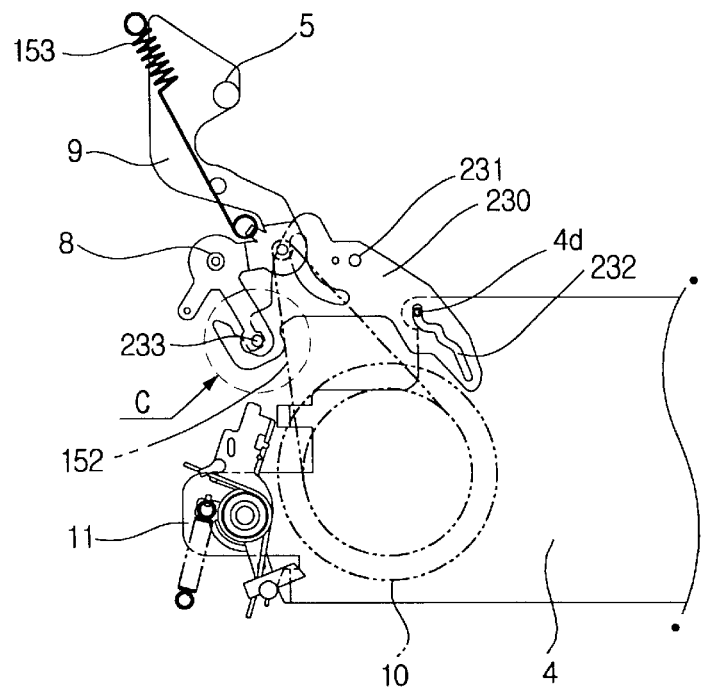
FIGS. 47 to 52 show other embodiment of the tape tension regulating device according to the present invention.
Figure 48:
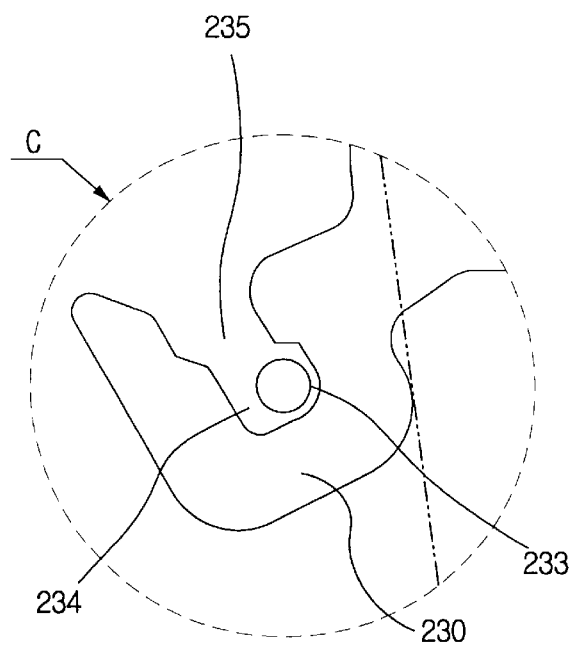
Figure 49:
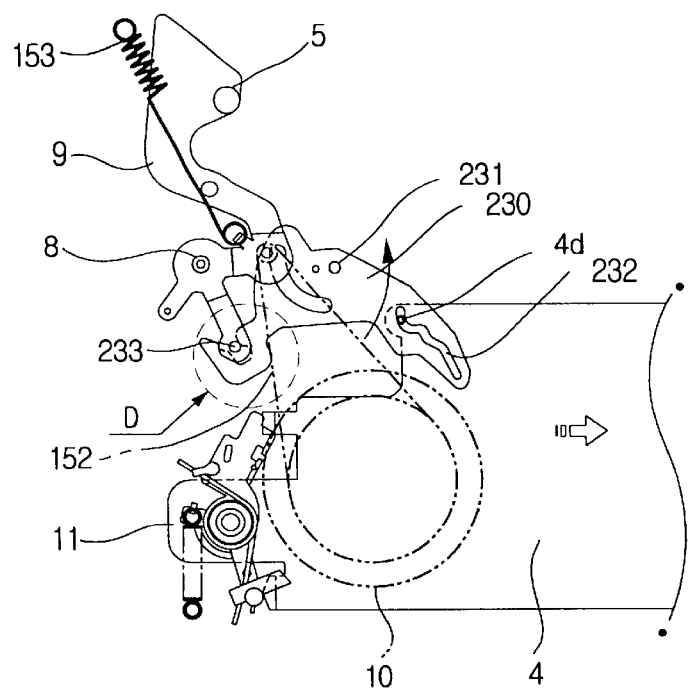
Figure 50:
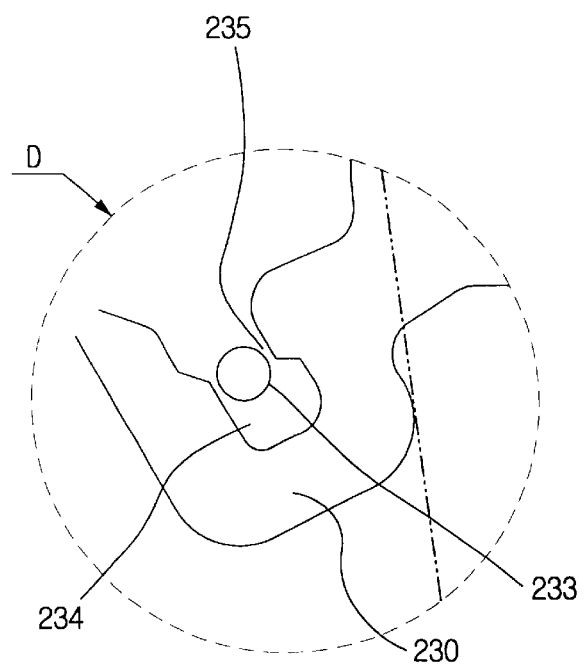

In the magnetic recording/reproducing apparatus according to the present invention, as shown in FIGS. 44 to 46, distance from a reel hub 261 (or 262) of a tape cassette 260 which is loaded on the sub chassis 2 to a head contacting part of the head drum device H is formed to be longer than a length of a lead tape L which is respectively provided at both ends of the tape. Therefore, although the lead tape L is completely loosed from the reel hub 261 (or 262), the lead tape L is not reached to the head contacting part, thereby preventing damage of a magnetic head owing to the lead tape L.

Hereinafter, the operation of the magnetic recording/reproducing apparatus according to the present invention, such as the tape loading and running, will be described.

FIGS. 1 and 2 show the magnetic recording/reproducing apparatus in the ESP mode, wherein the sub chassis 2 is maximally ejected from the main chassis 1 and the slider 4 is placed on the right of the main chassis 1.

Further, the solenoid 141 is in the off state and serves as an electromagnet. Therefore, the attachment portion 144 of the trans-latch 143 can be magnetically attached on a side of the solenoid 141.

The rod moving lever 110 mounted on the solenoid 141 is forced to be rotated in the counter clockwise direction by the elastic means 102. The latching pin 44 of the operational level 42 is inserted into the slot 112 of the rod moving lever 110. Therefore, the operational lever 42 is rotated in the clockwise direction so that the first power transmission gear 38 is engaged with the central gear pulley 36.

In this situation, if the tape cassette is loaded to the cassette housing (not shown), the power source is applied to the capstan motor M owing to the loading operation of the cassette housing so that the motor gear 31 is rotated in the counter clockwise.

The rotational force of the motor gear 31 is transmitted as follows: the driving gear pulley 32→the timing belt 37→the central gear pulley 36. The central gear pulley 36 is rotated in the clockwise direction.

The rotational force of the central gear pulley 36 is then transmitted as follows: the lower gear 35→the first power transmission gear 38→the second power transmission gear 39→the third power transmission gear 40→the cam gear 3. The cam gear 3 is rotated in the clockwise direction. Meanwhile, since the idle gear 63 is engaged with the upper gear 34 formed on the central gear pulley 36, the idle gear 63 is rotated by the rotation of the central gear pulley 36.

At this time, since the idle plate 61 is rotated in the clockwise direction with the shaft pin 33 in the center, the idle gear 63 is engaged with the reel gear 2a of the winding reel assembly 20. Therefore, a winding reel hum of the tape cassette is rotated so as to loose the tape.

On the other hand, since the interlocking lever 51, which connects the sub chassis 2 with the main chassis 1, is rotated by the rotation of the cam gear 3, the sub chassis 2 is linearly moved toward the inner side of the main chassis 1. The operation of the loading system is achieved by such movement of the sub chassis 2.

That is, since the supply side loading arm 72 is coupled to the latching pin 76 of the slider 4, the supply side loading arm 72 which is mounted to the sub chassis 2 is rotated in the clockwise direction owing to the movement of the sub chassis 2 toward the inner side of the main chassis 1. Therefore, the moment the supply side pole base 75, which is engaged with the supply side loading arm 72, is rotated in the counter clockwise direction with the shaft pin 73 in the center, the tension lever 9 is also rotated along the cam groove 1a with the shaft pin 8 in the center in the counter clockwise direction.

At this time, since the pushing piece 163 of the sub chassis 2 is taken off from the ULS switch 182 due to the movement of the sub chassis 2, the ULS switch 182 is turned on, whereby the ULS mode is detected.

Simultaneously, the connecting lever 93, which is connected through the latching pin 93a to the supply side loading arm 72, is also rotated in the clockwise direction with the shaft pin 91 in the center depending to the rotation of the supply side loading arm 72 in the clockwise direction. And the intermediate lever 94 which is connected through the latching pin 93b to the connecting lever 93 is rotated in the counter clockwise direction with the shaft pin 92 in the center.

As described above, the rotational force of the winding side loading arm 95, which is connected to the intermediate lever 94, is exerted on the winding side pole base 98 so that the winding side pole base 98 is raised upwardly. Therefore, the winding side pole base 98 is moved along the guide rail 97, 97'.

Accordingly, due to the moving operations of the supply side pole 74 of the supply side loading arm 72, the tension post 5 of the tension lever 9, the slant post 87 of the winding side pole base 98, and the guiding roller 88, the tape is loaded on both sided of the rotary head drum device H which is rotated at a high speed.

Figure 23:
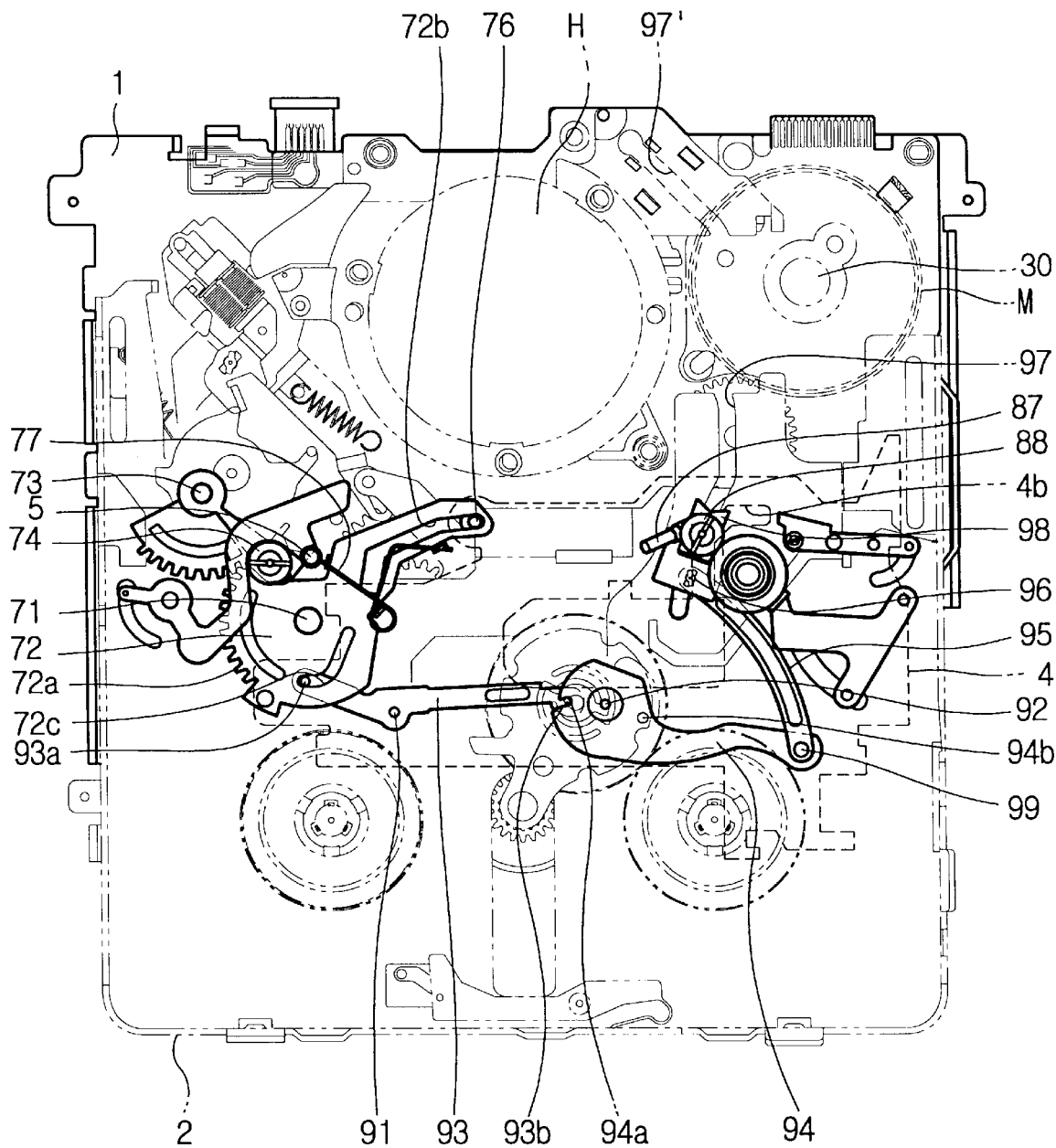
Figure 24:
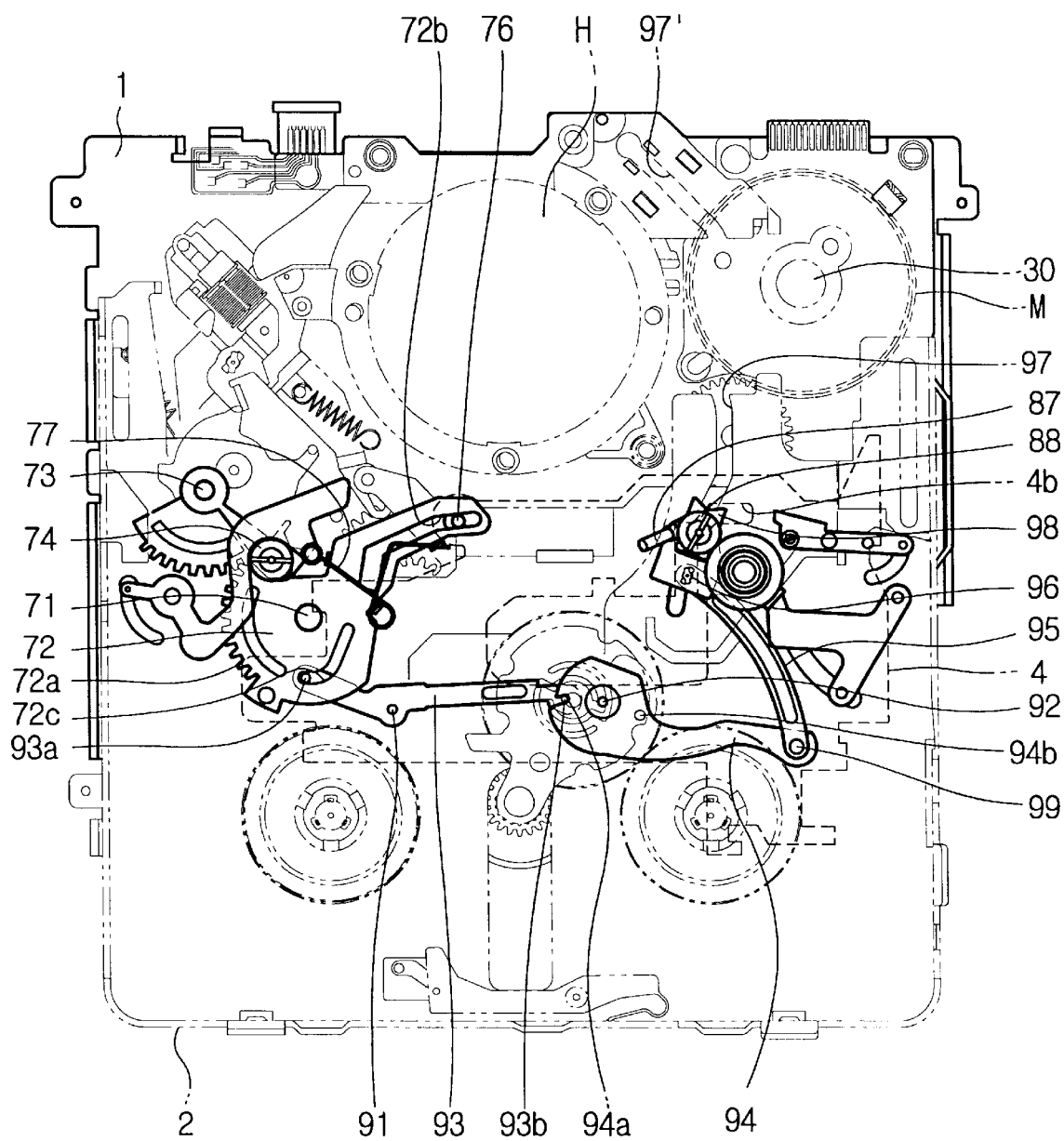
Figure 25:
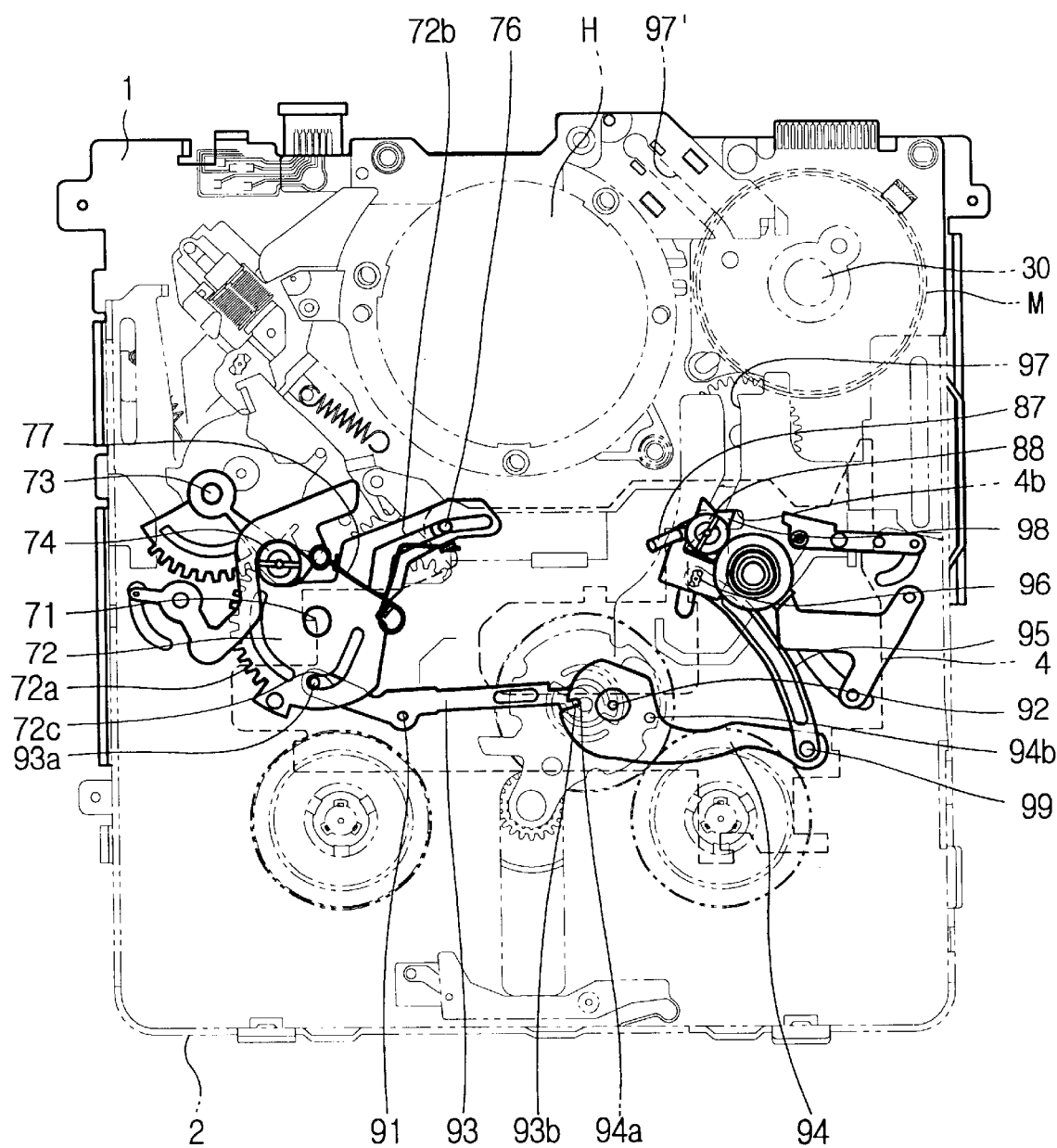
Figure 26:
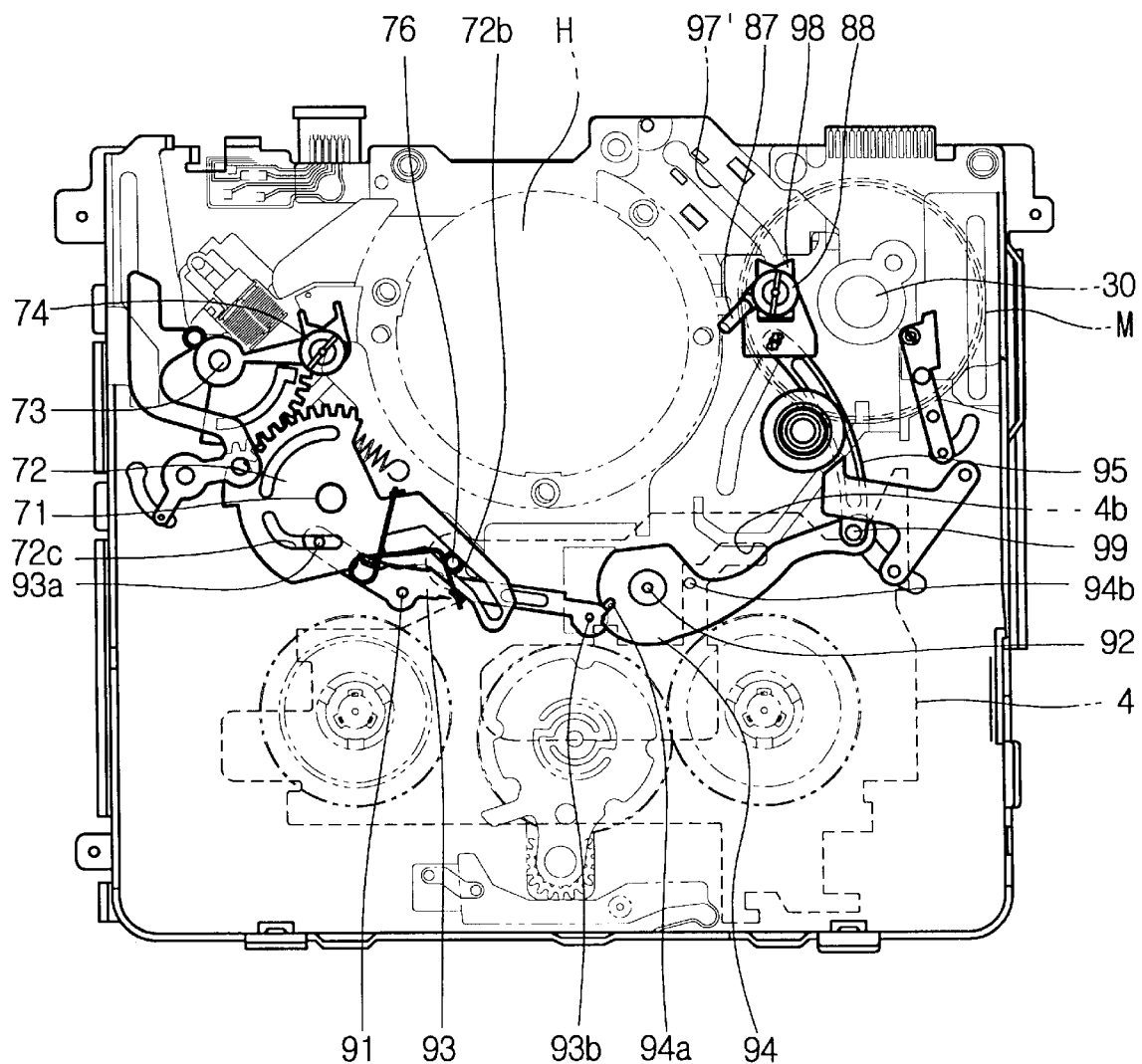
Figure 27:
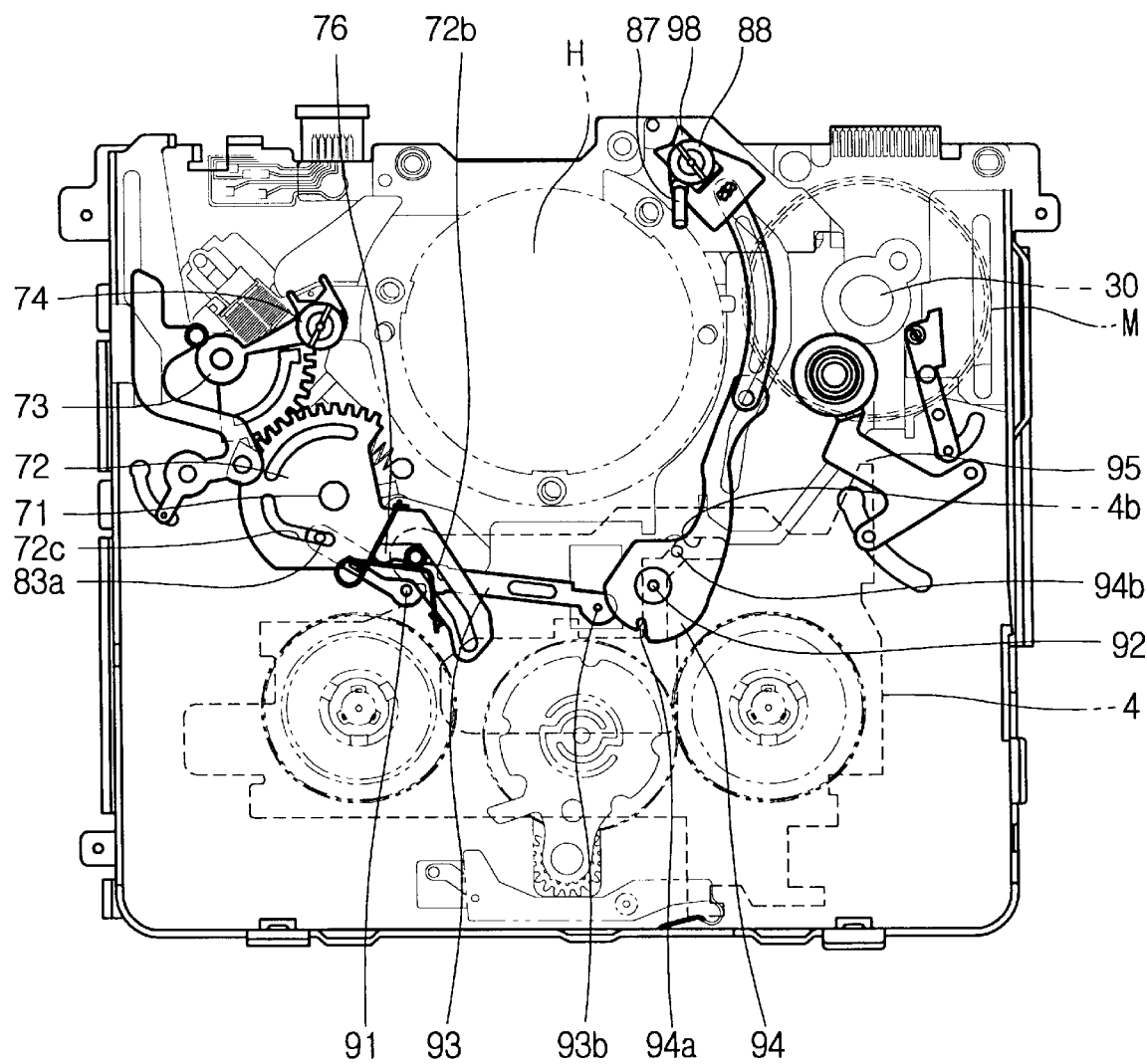

Depending on the position of the tape according to the movement of the tape running elements, the modes are proceeded in order as follows: the ESP mode→the EJECT mode→the ULS mode→the SL mode→the STOP mode→the PB mode. The ESP mode is shown in FIGS. 1, 2 and 23, the EJECT mode is in FIGS. 3 and 24, the ULS mode is in FIGS. 4 and 25, the SL mode is in FIG. 26, the STOP mode is in FIGS. 5 and 27, and the PB mode is in FIGS. 6 and 28.

As described above, the SL mode in FIG. 26 is in a state that the tape is loaded, due to the moving operations of the running elements such as the supply side pole 74 of the supply side loading arm 72, the tension post 5 of the tension lever 9, the slant post 87 of the winding side pole base 98, and the guiding roller 88. In this situation, if the cam gear 3 is further rotated in the clockwise direction, the slider 4 is moved to the left side of the figure. Therefore, the latching pin 76 of the slider 4 is moved along the guiding slot 72b of the supply side loading arm 72 so as to push a side portion of the torsion spring 77 which is positioned in the fixing section 72b'. The pushing force exerted on the torsion spring 77 is transmitted to the supply side loading arm 72 so as to stabilize the supply side loading arm 72.

As described above, the supply side loading arm 72 is rotated at a desired angle due to the rotation of the cam gear 3. Also, the winding side pole base 98 is further moved along the guide rail 97'. The mode is proceeded to the STOP mode and the PB mode.

Figure 6:
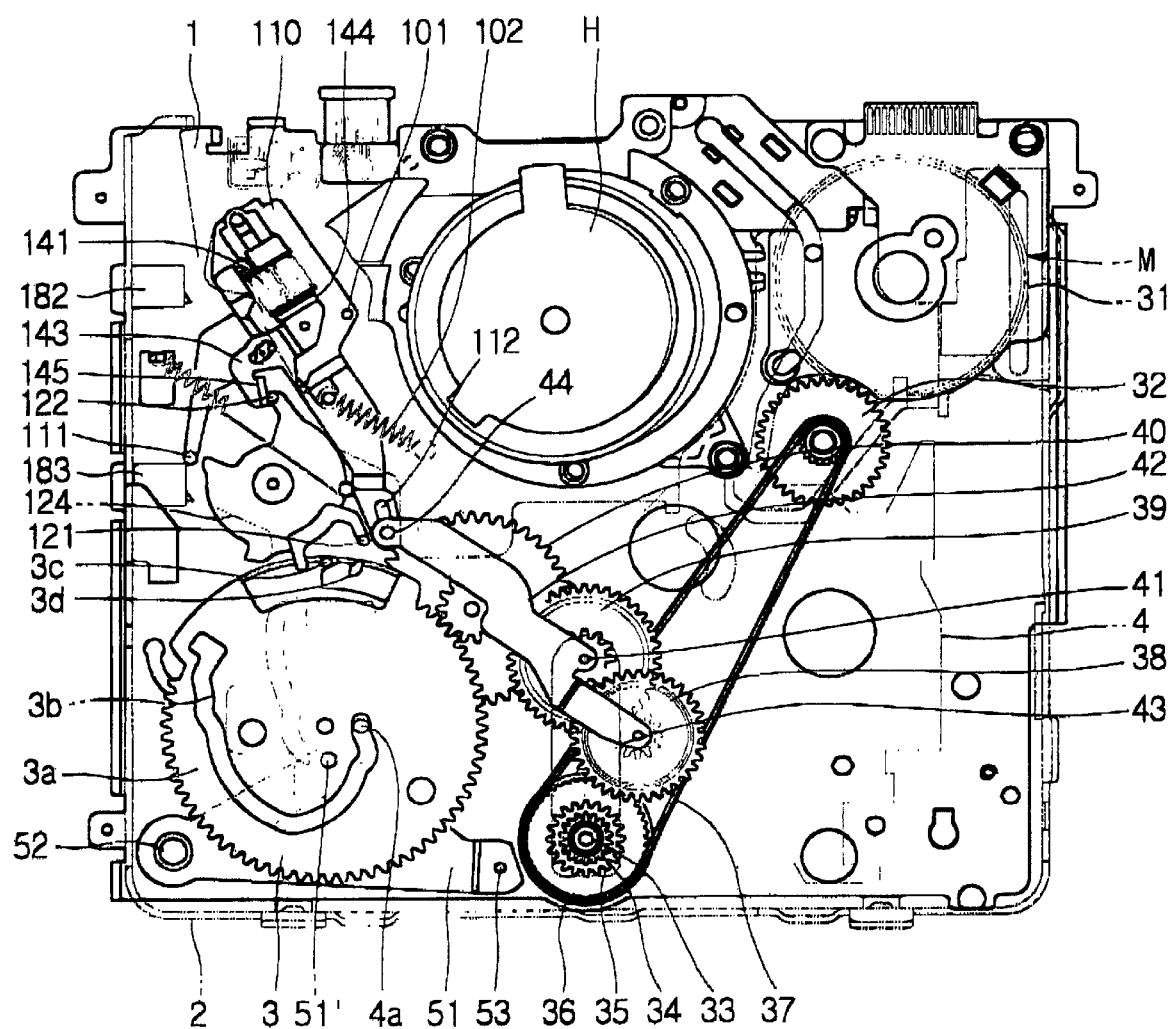
Figure 7:
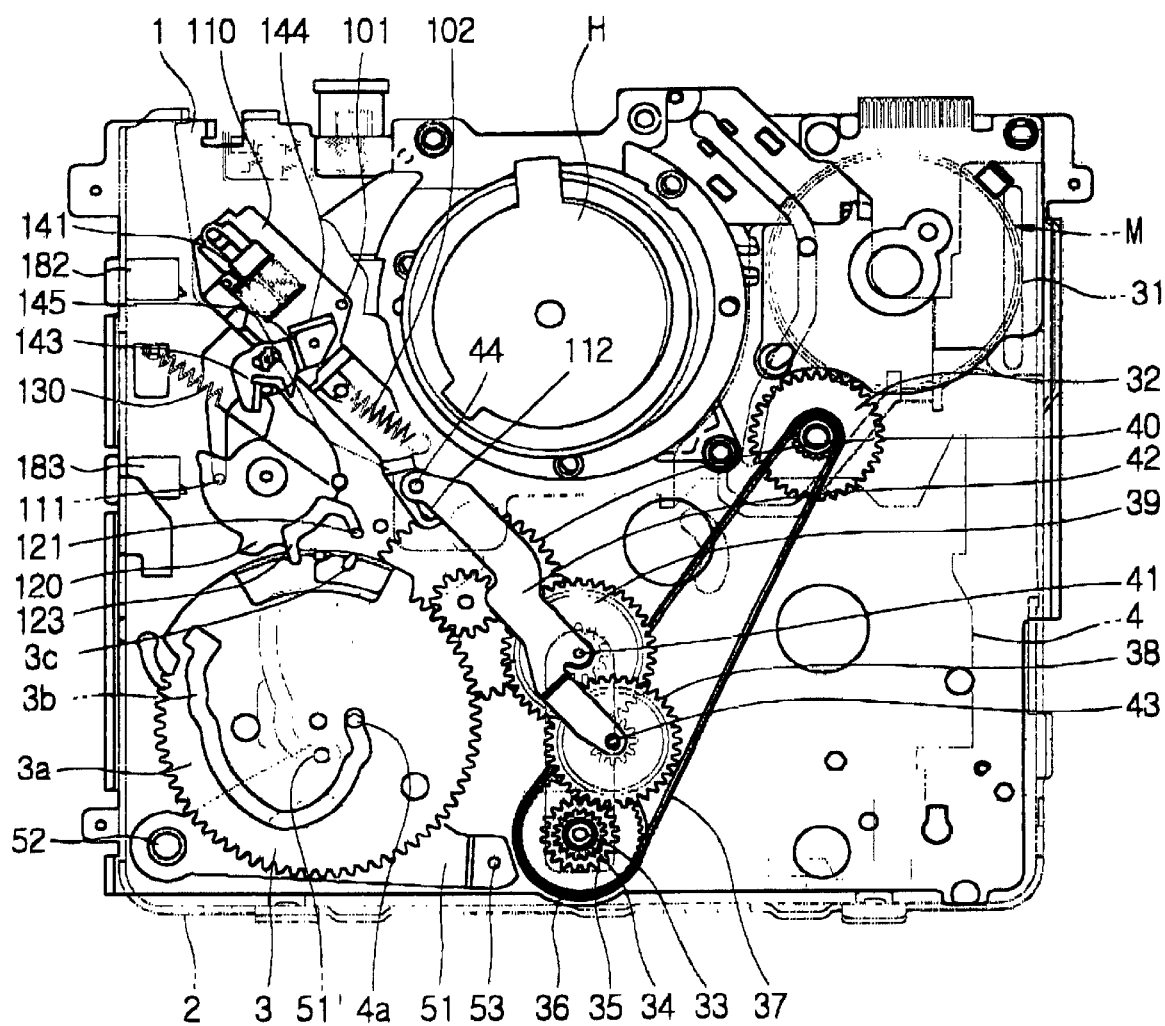
Figure 28:
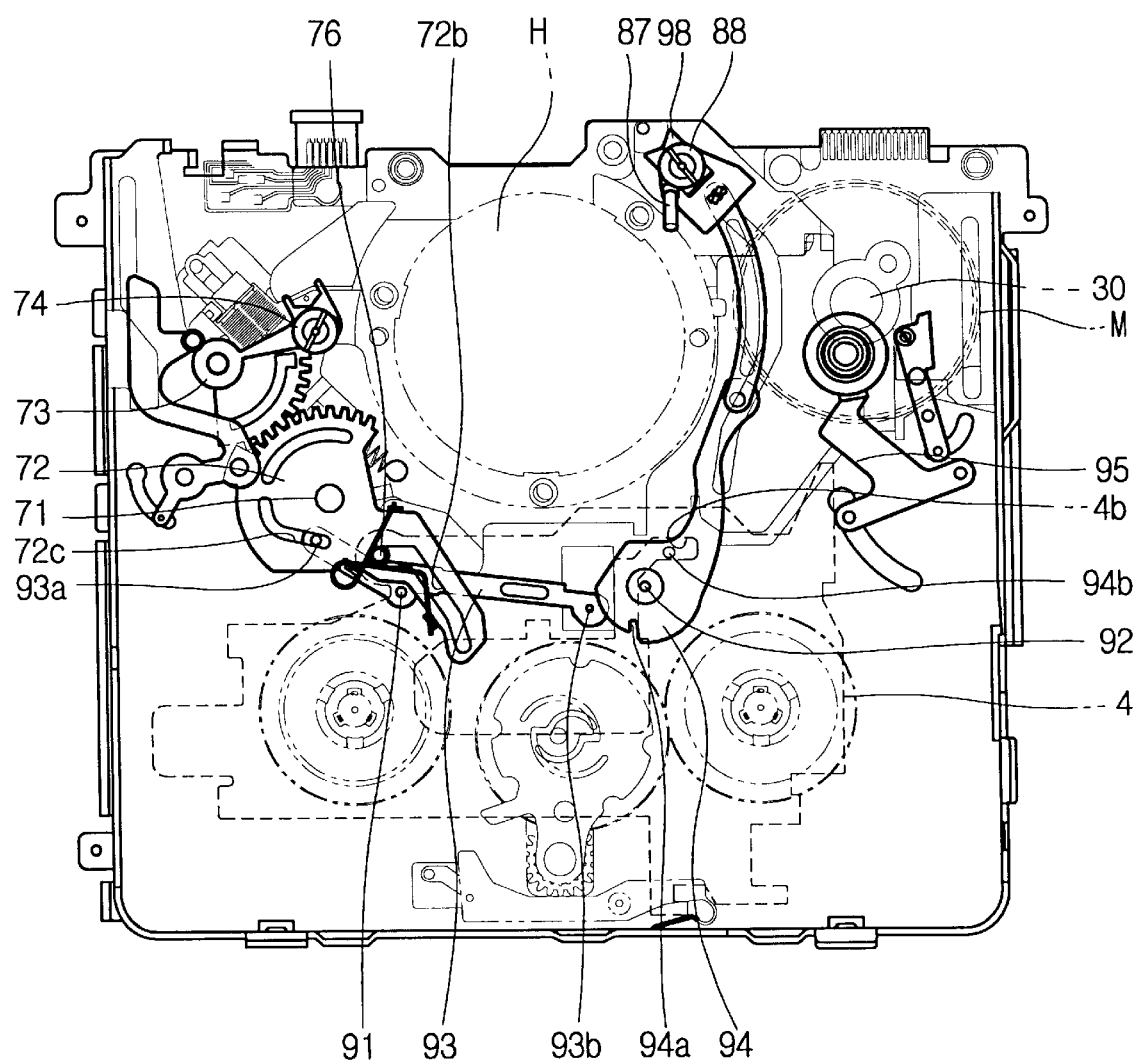

In the PB mode shown in FIGS. 6 and 28, the tape loading operation is completed. Therefore, a pinch roller 6 and the tape guiding portion 7 are completely moved to a guiding position for the tape running. Particularly, the pinch roller 6 is pressed to the capstan shaft 30 of the capstan motor M, the tape can be run.

Figure 17:
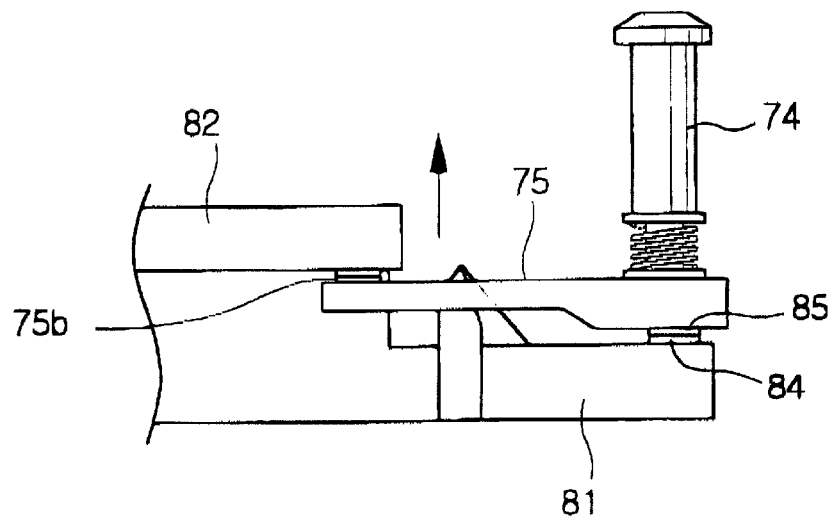

In the tape loading operation as described above, the moving operation of the supply side pole base 75 will be explained in full detail. As shown in FIGS. 15 to 17, the end of the supply side pole base 75 is rased and supported by the conical guiding protrusion 83 of the guiding member 80, thereby being raised to a desired height. Thus, the supply side pole base 75 is located in place.

The side protrusions 75b, 75c of the supply side pole base 75 is contacted and supported to both sides of the supper guiding portion 82 of the guiding member 80. And the supporting protrusion 85, which is formed at the middle portion of the lower face of the supply side pole base 75, is contacted and supported to the center protrusion 84 of the lower guiding portion 81. Accordingly, the supply side pole base 75 is stabilized by the three-point suspension method, thereby securing the stability for the tape running.

In the running system of the magnetic recording/reproducing apparatus according to the present invention, since the supply side pole 74, is inclined at a desired angle on the supply side pole base 75' as shown in FIGS. 18 to 22, the upper end of the tape is guided by the spiral portion 209 of the spiral flange 206 which is coupled to the upper portion of the supply side pole 74'. The lower end of the tape is guided by the lower flange 203, while being maintained at an incidence angle of 0°. Therefore, the tape running operation is stabilized by a single supply side pole 74' which serves both as the existing slant post and the guiding roller.

At the time that the tape is loaded as described above, it should be noted that the first power transmission gear 38 is always engaged with the central gear pulley 36, and then the first power transmission gear 38 is disconnected from the central gear pulley 36 in the PB mode. It means that the cam gear 3 is stopped in the PB mode when the tape is loaded.

Hereinafter, the feature operation of the power transmission of the loading system according to the present invention will be described in detail.

Figure 3:
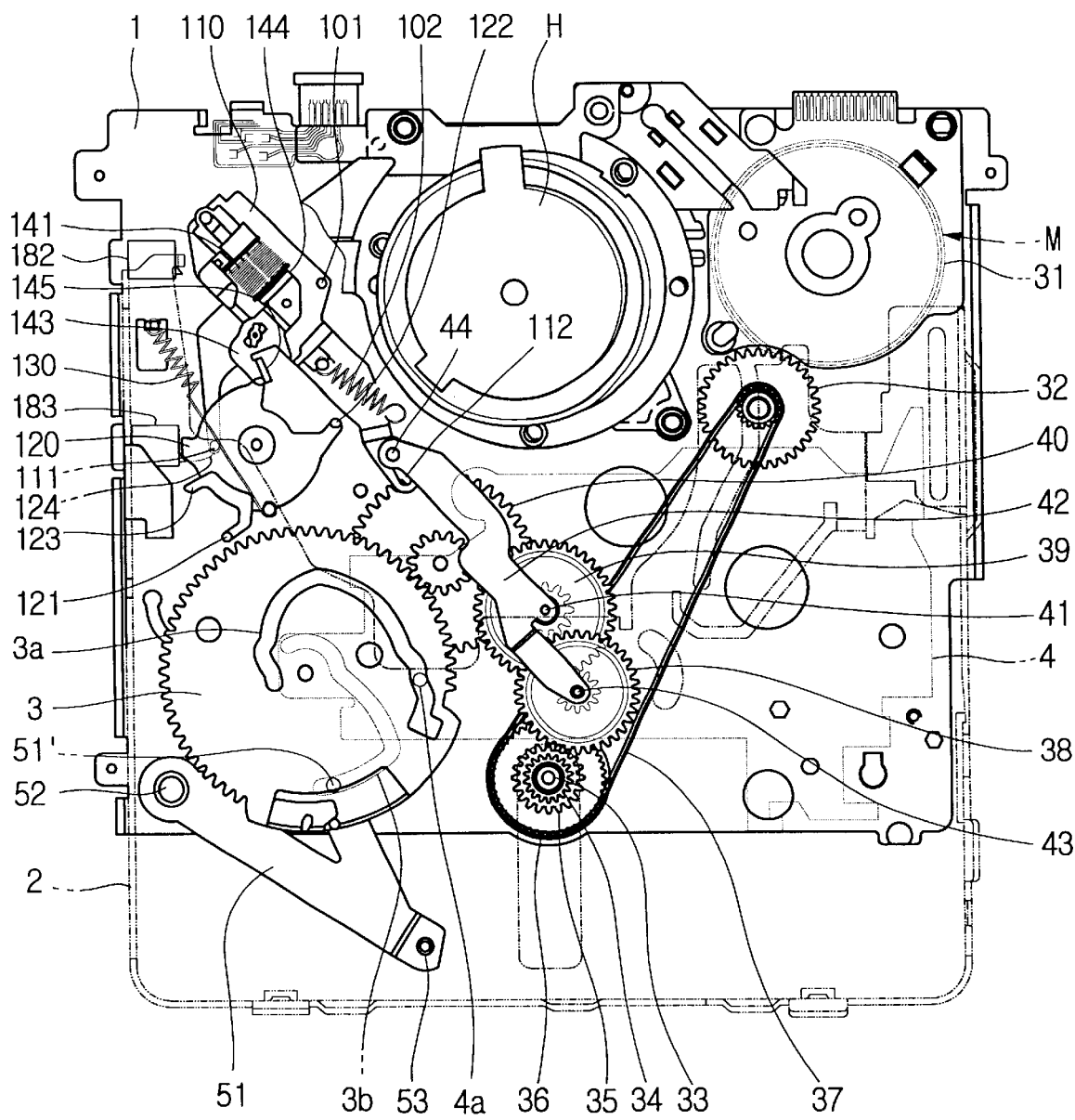
Figure 4:
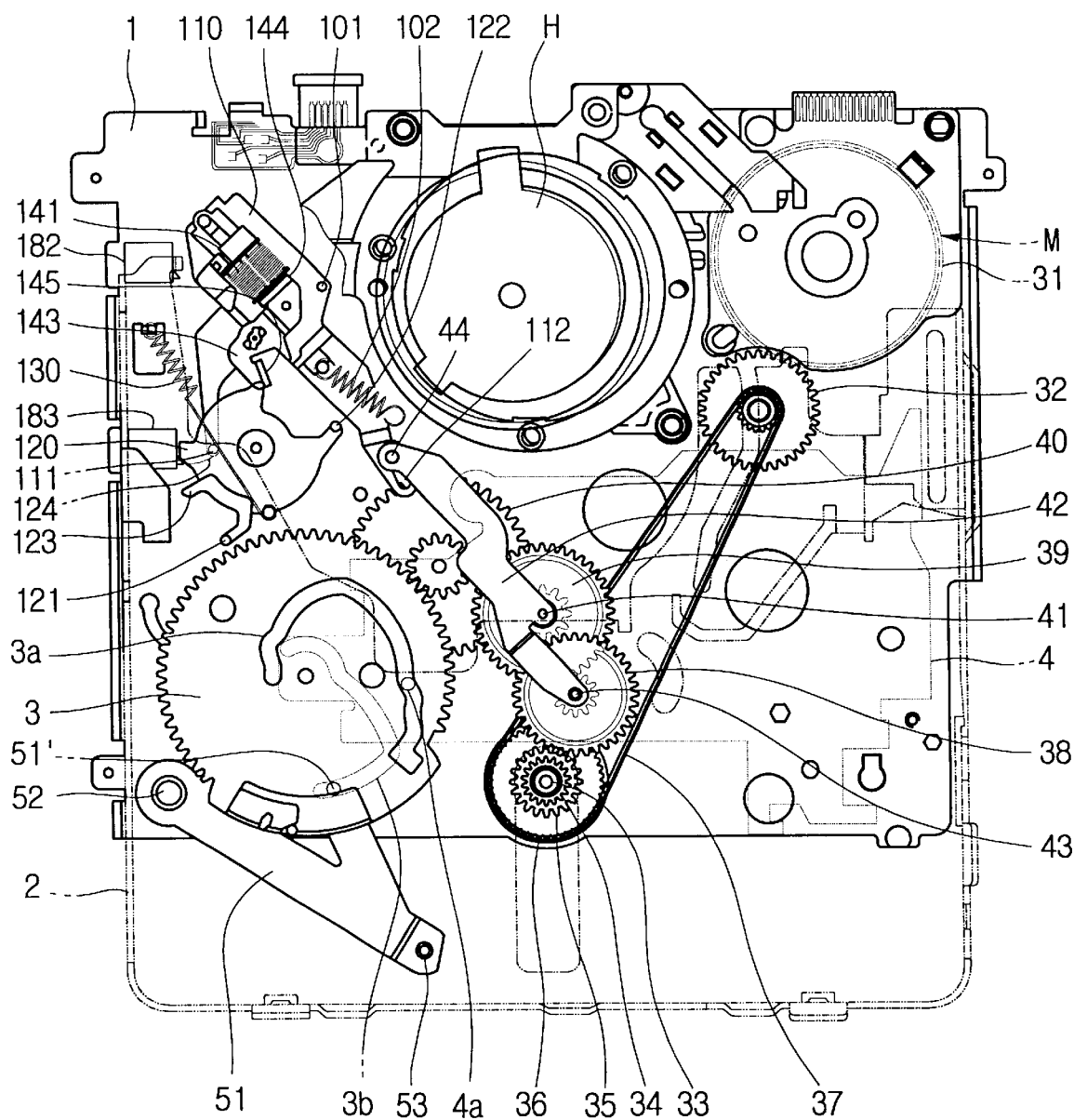

As shown in FIGS. 2 to 4, during the ESP mode→the EJECT mode→the ULS mode, the power transmission device of the loading system is not operated.

Figure 5:
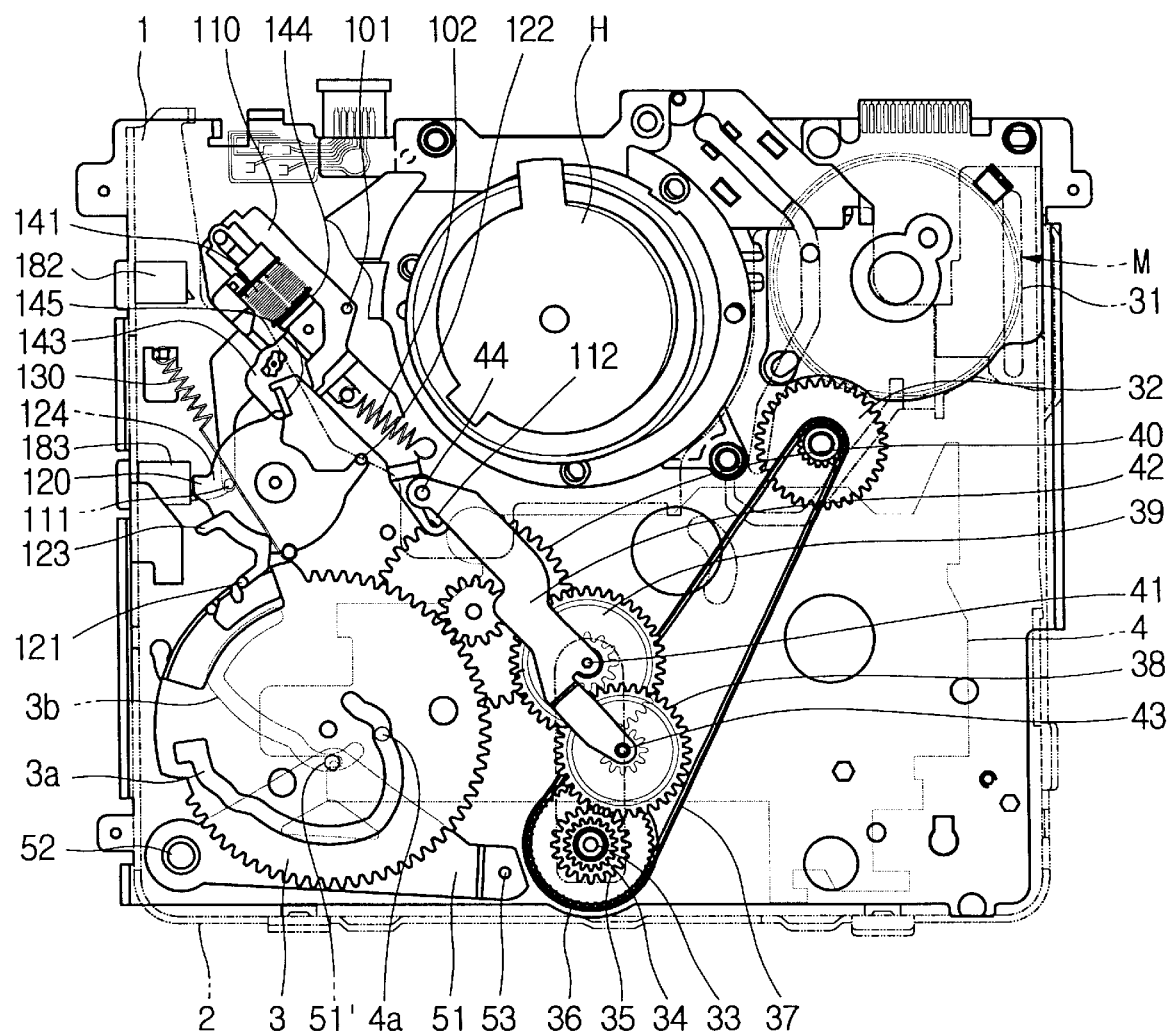

If the cam gear 3 is rotated at a desired angle in the clockwise direction, the mode is proceeded to the STOP mode in FIG. 5. At this time, since the first projection 121 is pushed by the cam projection 3c of the cam gear 3 in the STOP mode, the shift rotating member 120 is rotated in the counter clockwise direction. Therefore, the switch operating part 125 of the shift rotating member 120 is got off from the STOP switch 183, whereby the STOP switch 183 is turned on.

According as the shift rotating member 120 opposes to the elastic force of the elastic means 130 and rotates at a desired angle, the first protrusion 121 is displaced along a track as follows: ①→②→③→④ in FIG. 8. The first protrusion 121 is moved along another cam curve in the position of ③, and controls a racing start timing of the shift rotating member 120 according to a rotational angle of the cam gear 3 in the position of ④.

In a moment that the shift rotating member 120 is passed over the maximum tension point of the elastic means 130 according to the rotation thereof, the shift rotating member 120 is taken off from the cam projection 3c of the cam gear 3 and then momently rotated by the elastic force of the elastic means 130. Due to the rotating operation of the shift rotating member 120, the second protrusion 122, which is formed on the other side of the shift rotating member 120, pushes the latching portion 145 of the trans-latch 143.

At this time, since the solenoid 141 is in the off state, the rod moving lever 110, on which the solenoid 141 is mounted, opposes to the elastic force of the elastic means 102 and rotates at a desired angle in the clockwise direction, due to the rotating operation of the shift rotating member 120. The operational lever 42 is rotated in the counter clockwise owing to the rotating operation of the rod moving lever 110 so that the first power transmission gear 38 is disconnected from the central gear pulley 36. In this state, the PB mode shown in FIG. 6 is performed.

In the PB mode, the FG of the capstan motor M is counted on the basis of the signal which is generated by the STOP switch in the STOP mode and a rotating number of the motor M is then determined. The rotating number of the motor M is divided by a reduction gear ratio of the gear train. Then the present PB mode is detected by the result value.

Meanwhile, since, upon the loading operation in which the cam gear 3 is continuously rotated, the latching pin 111 of the rod moving lever 110 is inserted into the guiding groove 125 formed on the lower face of the shift rotating member 120, the operational lever 42 is optionally rotated so as to prevent the first power transmission gear 38 from being disconnected from the central gear pulley 36. Therefore, the connection between the first power transmission gear 38 and the central gear pulley 36 is maintained.

After that, in the PB mode, the rod moving lever 110 is rotated so that the latching pin 111 of the rod moving lever 110 is taken off from the guiding groove 124 of the shift rotating member 120, whereby the operational lever 42 is not confined any more.

If an unloading signal is applied in the PB mode shown in FIG. 6, the motor gear 31 of the capstan motor M is rotated in the reverse direction, i.e. the clockwise direction. The central gear pulley 36 is rotated in the counter clockwise direction.

Simultaneously, the power source is applied to the solenoid 141 so that a repulsion is generated from the solenoid 141. Therefore, the trans-latch 143 is rotated in the clockwise direction. The rod moving lever 110 is rotated in the counter clockwise direction owing to a restoring force of the elastic means 102 so that the operational lever 42 is rotated in the clockwise direction at a desired angle. Therefore, the first power transmission gear 38 is engaged with the central gear pulley 36 which is rotated in the counter clockwise direction.

At this time, if the rotational force of the capstan motor M is reached through the central pulley 36, the first, second and third power transmission gear 38, 39, 40 to the cam gear 3, the central gear pulley 36 and the first, second and third power transmission gear 38, 39, 40 are respectively rotated in arrows direction shown in FIG. 10. A load PO of the cam gear 3 is applied in an arrow as shown in FIG. 10. And between the third, second and first power transmission gear 40, 39, 38 and the central gear pulley 36, each load P1, P2, P3 is generated. As a result, according as the hinge point H of the gear train is disposed in place, and the operational lever 42 is rotated in the clockwise direction, the first power transmission gear 36 is engaged with the central gear pulley 36, whereby the connection in the early re-connection is maintained.

Figure 8:
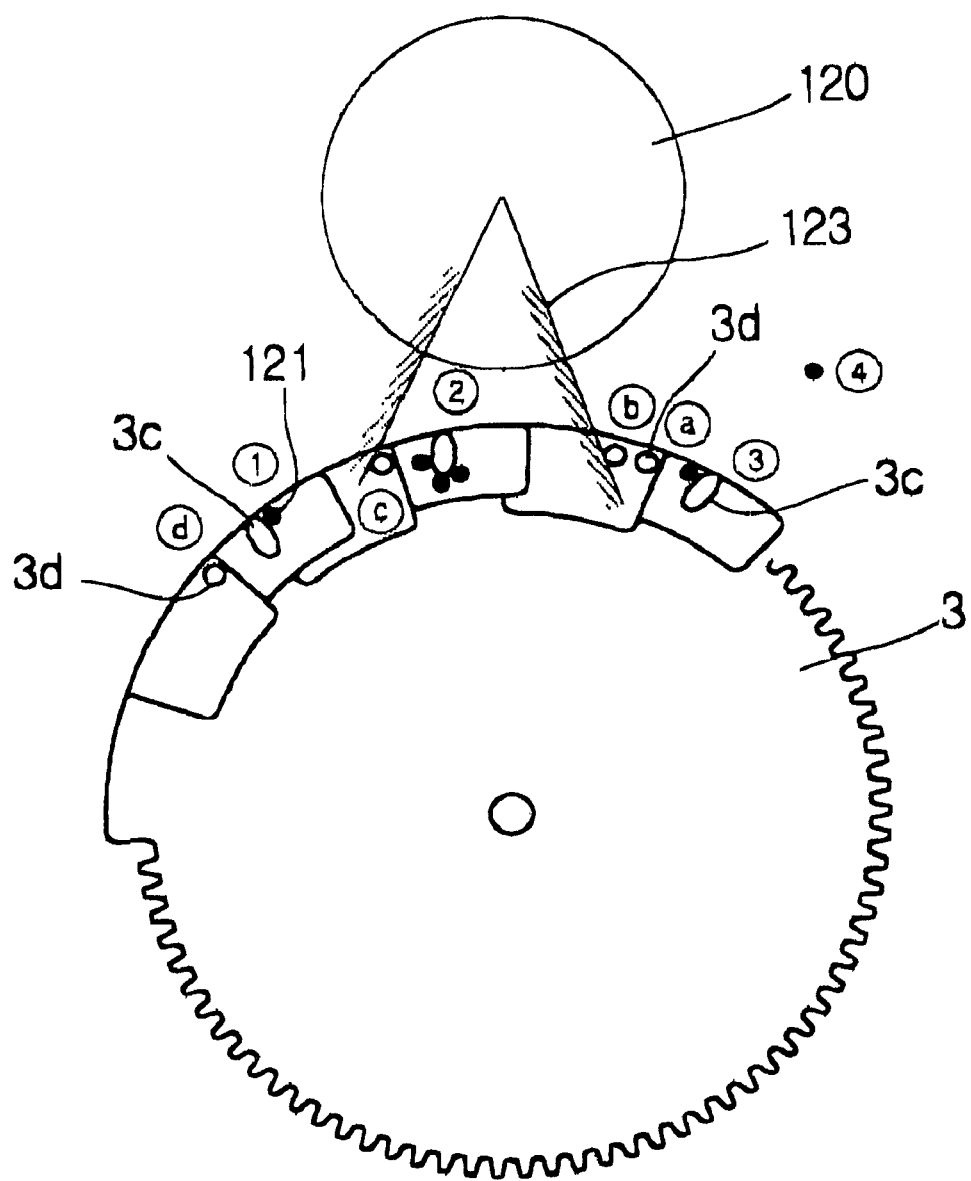
Figure 9:
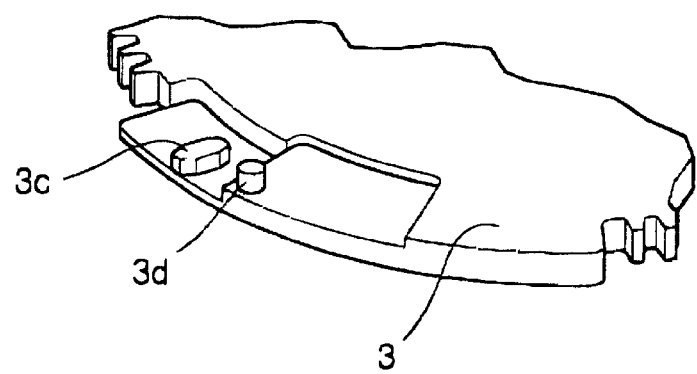

Then, according as the cam gear 3 is continuously rotated in the counter clockwise, as shown in FIG. 8, the operating pin 3d of the cam gear 3 is moved along a track as follows: a→b→c→d in FIG. 10.

The position of a is a racing position in which the operating pin 3d of the cam gear 3 is connected to the third protrusion 123 of the shift rotating member 120. If the operating pin 3d of the cam gear 3 is passed over the position of b and c, a switching operation of the shift rotating member 120 is performed. If the switching operation of the shift rotating member 120 is performed during passing through the position c and d, it is returned to an initial state by the elastic means 130. Owing to such operation, the STOP switch 183 is pushed by the switch operating part 125 and turned on.

Sequentially, due to the continuous rotation of the cam gear 3, the ULS mode and the EJECT mode are proceeded. Here, the ULS mode will be described more fully.

That is, when it is proceeded from the PB mode to the ULS mode, it is returned from the EJECT mode to the ULS mode. At this time, since the ULS mode is in the off state (because the deck should not move), after counting the PG of the capstan motor M and determining the rotating number of the motor M, the rotating number of the motor M is divided by the reduction gear ratio of the gear train. Then the present PB mode is detected by the result value.

Then, if the cassette housing is ejected owing to the continuous rotation of the cam gear 3, the cassette-in-switch 181 is turned off, thereby reaching to the PB mode via the EJECT mode.

The tape tension regulating means releases the tension of the magnetic tape in the mode changing process from the PB mode to the STOP mode, in order to prevent the damage of the magnetic tape in case that the tape is not used for a long time and facilitate a starting of the head drum in the PB mode and also prevent an excessive tension from being exerted on the magnetic tape upon the tape loading operation. Here, these operations will be described more fully.

As described above, when the sub chassis 2 is moved to the rear side, the latching pin 155 of the tension lever 9 is moved along the cam groove 1a of the main chassis 1, and the tension lever 9 is rotated in the counter clockwise direction with the shaft pin 8 in the center.

And then, in the time of almost completing the loading operation of the magnetic tape, if the cam gear 3 is further rotated in the clockwise direction, the slider 4 is moved to the left side of the figure. At this time, as shown in FIG. 34, while the slider 4 is moved, the latching portion 160 pushes the supply side braking means 11 so as to generate the rotational force of the supply side braking means 11 in the counter clockwise direction. Owing to the rotation of the supply side braking means 11, the power relaying means 154 is rotated in the clockwise direction at a desired angle.

The supply side braking means 11 is rotated in the counter clockwise direction by the slider 4 so as to be taken off from the supply reel assembly 10. The tension lever 9 is further rotated in the counter clockwise direction by the restoring force of the elastic means 153. The first cam part 158 of the power relaying means 154 is located on the latching pin 155 of the tension lever 9.

FIG. 34 shows the PB mode in which the loading operation of the tape is completed. In the PB mode, the pinch roller 6 and the tape guide 7 are located on the tape guiding position. Particularly, the pinch roller 6 is pressed to the capstan shaft 30 of the capstan motor M by a desired pressure so as to be capable of the tape running.

If a STOP mode signal is applied to the PB mode, the motor gear 31 of the capstan motor M is rotated in the reverse direction, i.e. the clockwise direction. Therefore, the cam gear 3 is reversely rotated at a desired angle so that the slider 4 is moved to a desired distance. The pinch roller 6 is apart from the capstan shaft 30 of the capstan motor M so that the tape is not run.

In addition, as shown in FIG. 35, when the slider 4 is moved to the right side, while an external force exerted on the supply side braking means 11 is removed, the supply side braking means 11 receives a rotational force in the clockwise direction so as to restrict the rotation of the supply reel assembly 10. And due to the rotation of the supply side braking means 11, the power relaying means 154 is rotated in the counter clockwise direction at a desired angle. Thus, the second cam part 159 of the power relaying means 154 pushes the latching pin 155 of the tension lever 9 so that the tension lever 9 is rotated in the clockwise direction at a desired angle.

As described above, the tension lever 9 is slightly rotated to the clockwise direction in the STOP mode, thereby reducing the tension exerted on the magnetic tape.

FIGS. 47 to 52 show one embodiment of the tape tension regulating means of the magnetic recording/reproducing apparatus according to the present invention. The power relaying means 230 is mounted between the slider 4 and the tension lever 9 without the supply side braking means 11, thereby properly controlling the position of the tension lever 9 via the power relaying means 230 according to the position of the slider 4.

That is, the power relaying means 230 is rotatably mounted on a part of the sub chassis 2 by a shaft pin 231. The power relaying means 230 is provided with the cam groove 235 in which the connecting pin 4d fixed to a desired portion of the slider 4 is inserted.

Furthermore, the first and second cam part 234, 235, which are guided to the latching pin 233 fixed to the tension lever 9, are respectively provided on a desired portion of the tension lever 9.

The first cam part 234 has a comparative wide space so that the latching pin 233 can be moved therein. The second cam part 235 has a width similar to a diameter of the latching pin 233 so that the tension lever 9 can not be moved when the latching pin 233 is located in the second cam part 235.

In the embodiment of the tape tension regulating means, the slider 4 is moved to the left side in the PB mode. Owing to the movement of the slider 4, the power relaying means 230 is rotated in the clockwise direction and the tension lever 9 is rotated in the counter clockwise direction.

At this time, since the latching pin 233 of the tension lever 9 is located in the first cam part 234 of the power relaying means 230, the tension lever 9 can be freely rotated. Therefore, the tensions lever 9 regulates the tension of the tape while being rotated an a desired angle.

Figure 51:
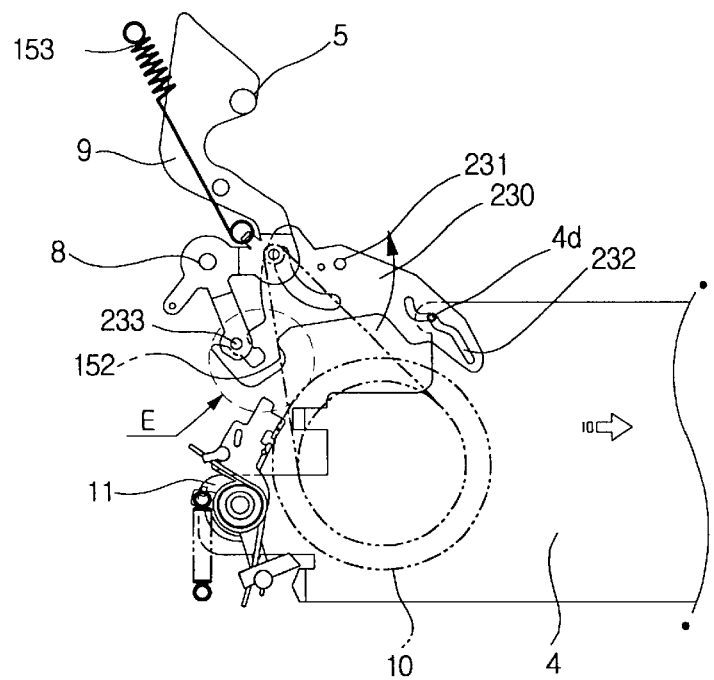
Figure 52:
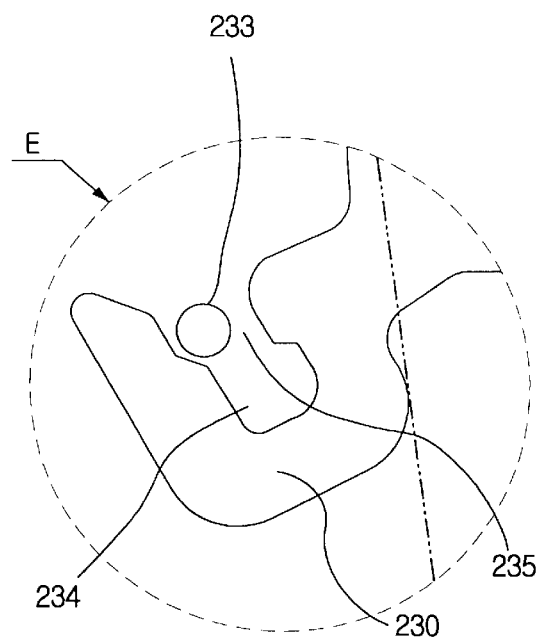

As described above, if the STOP mode signal is applied in the PB mode, the slider 4 is moved to the right side. The external force exerted on the supply side braking means 11 is released. The supply side braking means 11 receives the rotational force in the clockwise and restricts the rotation of the supply reel assembly 10. And due to the shape of the cam groove 232 in which the latching pin 4d of the slider 4 is inserted, the power relaying means 230 is rotated in the counter clockwise direction at a desired angle so that the latching pin 233 of the tension lever 9 is located between the first cam part 234 and the second cam part 235 of the power relaying means 230. As shown in FIGS. 51 and 52, if the slider 4 is further moved and reached to the STOP mode, the power relaying means 230 and the tension lever 9 are also interlocked each other as much as the moved distance of the slider 4 so as to release the tension of the tape. At this time, since the latching pin 233 of the tension lever 9 is located in the second cam groove 235 of the power relaying means 230, the rotating operation of the tension lever 9 is restricted.

Meanwhile, when the mode is changed from the STOP mode to the PB mode, the slider 4 is moved to the left side. Finally, in the PB mode, the latching pin 233 of the tension lever 9 is located in the first cam part 234 of the power relaying means 230. Therefore, the latching pin 233 can not restrict the tension regulating operation.

Here, the operation of the idler power transmission controlling means, which prevents a rotational force of the idle gear 63 from transmitting to the supply reel assembly 10 in a certain mode, will be described more fully.

If the STOP mode signal is applied in the PB mode of FIG. 37, the motor gear 31 of the capstan motor M is rotated in the reverse direction, i.e. the clockwise direction. Therefore, the cam gear 3 is reversely rotated so that the slider 4 is reversely moved to a desired distance. The pinch roller 6 is apart from the capstan shaft 30 of the capstan motor M. Therefore, the tape is not run.

Figure 38:
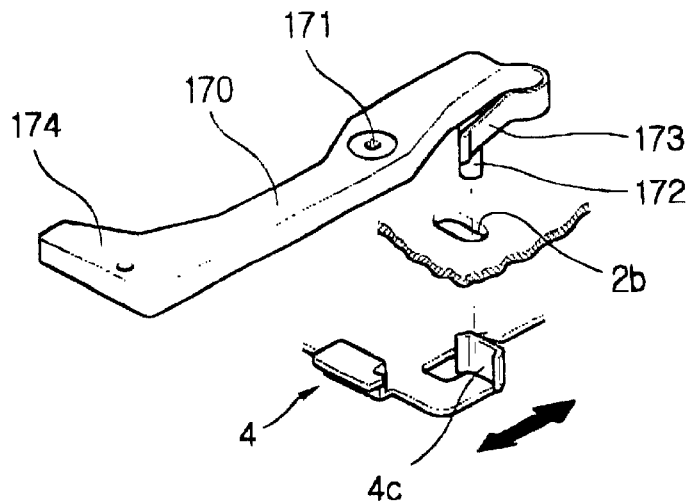

Simultaneously, according to the movement of the slider 4, the latching part 4c (FIG. 38) of the slider 4 pushes the operational portion 172 of the idler stopper 170 so that the idler stopper 170 receives a rotational force in the clockwise direction. Therefore, the idler stopper 170 opposes to the elastic force of the elastic rib 173 and the rotating operation is performed.

At this time, the idle plate 61 which is rotated by the rotational force of the capstan motor M receives a rotational force in the counter clockwise with respect to the shaft pin 33. As shown in FIG. 36, the idle latching part 61a of the idle plate 61 is latched to the latching part 174 of the idler stopper 170 due to the rotating operation of the idle plate 61, thereby preventing the idle gear 63 from being engaged with the reel gear 10a of the supply reel assembly 10.

Therefore, since the rotation of the reel gear 10a of the supply reel assembly 10 is prevented, the tape is not forced to be withdrawn. In the STOP mode as described above, since the tension is not exerted on the magnetic tape, although the tape is not use for a long time, thereby preventing the damage of the magnetic tape.

As described above, if the unloading signal of the magnetic tape is applied to the STOP mode, the slider 4 is moved to the right side by the rotation of the cam gear 3. The latching part 4c of the slider 4 is taken off from the idler stopper 170. The idler stopper 170 is rotated in the counter clockwise by the elastic rib 173 and returned to the initial state. Thus, the idle gear 63 is engaged with the reel gear 10a of the supply reel assembly 10 so that the unloading operation of the magnetic tape is performed.

According to the magnetic recording/reproducing apparatus of the present invention, the size of a deck mechanism is reduced almost as much as that of the tape cassette, thereby reducing the whole size of the apparatus and simplifying the construction thereof.

Although the invention has been shown and described with respect to the preferred embodiment, it will be understood by those skilled in the art that various changes and modifications may be made without departing from the spirit and the scope of the invention as defined in the following claims.

What is claimed is:

1. A magnetic recording/reproducing apparatus, comprising:

a driving source;

a main chassis on which the driving source is mounted;

a sub chassis which is disposed to the main chassis so as to be slid in a front and rear direction, and which is provided with various tape running elements;

a head drum device which is mounted on the main chassis;

a loading system provided with a supply side pole base driving device and a winding side pole base driving device which loads a tape depending on the moving operation of the sub chassis in the front and rear direction;

a running system which runs the tape in a desired direction at a desired speed;

a main power transmitting means which selectively transmit a power of the power source to the loading system or the running system;

a cam gear which is rotated by the main power transmitting means and transmits the power to each mode;

a slider which is disposed between the main chassis and the sub chassis so as to be slid in a left and right direction and interlocked with the cam gear;

a mode detecting means which detects each mode according to the tape running;

a tape tension regulating means which applies a proper tension to the tape;

an automatic separating means which automatically blocks a power transmission to the loading system in a particular mode;

a connecting means which permits the power transmission to the loading system in a particular mode; and a connection maintaining means which maintains the power transmission at the time of loading/unloading the tape or in the early re-connection which transmits again the power to the loading system.

2. The magnetic recording/reproducing apparatus according to claim 1, wherein the automatic separating means comprises:
- a power transmitting means which transmits the power of the driving source to the cam gear,
- a rod moving lever which is rotatably coupled to one side of the main chassis and interlocked with the power transmission means,
- an elastic means which elastically supports the rod moving lever so that an elastic force is always exerted in one direction,
- a shift rotating member which is rotatably mounted on the other side of the main chassis and interlocks the rod moving lever depending on the rotation of the cam gear, and
- an elastic means which elastically supports the shift rotating member so that an elastic force is always exerted in one direction.

3. The magnetic recording/reproducing apparatus according to claim 2, wherein the power transmitting means comprises a plurality of power transmission gears which are mounted between a central gear pulley and the cam gear, and a operational lever which supports a part of the power transmission gears and is connected to the rod moving lever.

4. The magnetic recording/reproducing apparatus according to claim 3, wherein the power transmitting means comprises a third power transmission gear which is rotatably mounted on the main chassis and connected with the cam gear, a second power transmission gear which is engaged with the third power transmission gear, and a first power transmission gear which is coupled to an end of the operational lever rotatably coupled to a rotational center shaft of the second power transmission gear and which is selectively engaged with a central gear pulley.

5. The magnetic recording/reproducing apparatus according to claim 3, wherein the rod moving lever is provided with a slot at one end thereof, a latching pin which is inserted into the slot of the rod moving lever is formed on an end of the operational lever so that the rod moving lever is interlocked by a rotating operation of the operational lever.

6. The magnetic recording/reproducing apparatus according to claim 1 or 2, wherein the connecting means comprises a solenoid which is mounted on the rod moving lever, and a trans-latch which is rotatably mounted on the rod moving lever and interlocked with the shift rotating member and which is provided with an attachment portion magnetically attached to the solenoid.

7. The magnetic recording/reproducing apparatus according to claim 6, wherein the shift rotating member comprises a first protrusion which is guided by a cam projection formed on an outer circumference of an upper face of the cam gear, a second protrusion which operates a latching portion of the trans-latch, a third protrusion which is guided by an operational pin formed in the outer circumference of the cam gear.

8. The magnetic recording/reproducing apparatus according to claim 1, wherein the connection maintaining means comprises a guiding slot which is formed at the shift rotating member, and a latching portion which is formed at the rod moving lever and which is inserted into the guiding slot of the shift rotating member.

9. The magnetic recording/reproducing apparatus according to claim 6, wherein the attachment portion is separately formed from the trans-latch, a supporting portion is formed on an end of a trans-latch, an upper guiding portion is formed on the supporting portion, a fixing hole is provided on an upper face of the upper guiding portion so that a fixing protrusion of the attachment portion is inserted into the fixing hole, and on an inner side of the upper guiding portion, there is provided a supporting projection having a desired height so as to be capable of being minutely rotated with the supporting projection in the center.

10. The magnetic recording/reproducing apparatus according to claim 1, wherein the supply side pole base driving means comprises a supply side loading member which is rotatably coupled to a desired portion of the rear upper face of the sub chassis and which is interlocked by a loading operation of the sub chassis, and a supply side pole base which is rotatably mounted on an upper face of the sub chassis adjacent to the supply side loading member and in which a supply side guiding member is fixed at one side of the supply side pole base so as to be interlocked with the supply loading member.

11. The magnetic recording/reproducing apparatus according to claim 10, wherein the supply side guiding member comprises a post shaft which is provided to be slant at a desired angle of inclination on the upper face of a supply side pole base, an elastic member and a lower flange and a pole sleeve which are provided on an outer face of the post shaft in order, a top post guiding member which is fixed to a protrusion formed on the upper face of the supply side pole base so as to support an upper portion of the post shaft and which is integrally provided with a spiral flange for guiding an upper portion of a tape, and a regulating member which is screwed from the upper side of the top post guiding member to an upper end of the post shaft so as to adjust a height of the post shaft, and wherein a spiral portion is formed in parallel with the tape running direction at a tape running portion of the spiral flange.

12. The magnetic recording/reproducing apparatus according to claim 1, wherein the supply side pole base driving means comprises a guiding member which is provided with a lower guiding portion and an upper guiding portion apart form each other and which is mounted at the main chassis adjacent to a head drum device, side receiving means which are respectively formed on an upper face of each end of the supply side pole base and respectively supported on a lower face of the upper guiding portion when a loading operation is completed, a positioning means which is provided at one side of the lower guiding portion so that the supply side pole base can be positioned in a place, and a center receiving meas which is provided at the other side of the lower guiding portion and on which a middle part of the lower face of the supply side pole base is supported when the loading operation is completed, and wherein the supply side pole base is supported by a three-point suspension method.

13. The magnetic recording/reproducing apparatus according to claim 1, wherein the winding side pole base driving means comprises a first and second power transmitting means which is rotatably coupled to both sides of the sub chassis on the basis of a vertical center line of the sub chassis and interlocked with the slider, and a third power transmitting means which is interlocked with the second power transmitting means and of which one end is connected with a winding side pole base, the winding side pole base being moved along a winding side guide rail of the head drum.

14. The magnetic recording/reproducing apparatus according to claim 13, wherein the first power transmitting means is provided with a latching portion which is inserted into a cam groove of a supply side loading arm, the latching portion of the slider is inserted into a guiding slot formed on the supply side loading arm so that a moving force of the slider is transmitted through the supply side loading arm to the first power transmitting means.

15. The magnetic recording/reproducing apparatus according to claim 14, further comprising a torsion spring which is elastically supported to the supply side loading arm, wherein a part of the torsion spring is projected on a passage of the guiding slot so that the supply side loading arm is elastically supported in a particular mode according to the movement of the slider.

16. The magnetic recording/reproducing apparatus according to claim 1, wherein the tape tension regulating means comprises a tension lever which is rotatably mounted to the sub chassis, a tension post which is provided on an upper face of the tension lever, a tension band which is connected with one side of the tension lever and which is wound around a circumference of a supply reel assembly, and a power relaying means which is interlocked with the supply side braking means and which is provided with a first cam part and a second cam part which respectively have difference diameters so as to restrict a rotational angle of the tension lever.

17. The magnetic recording/reproducing apparatus according to claim 1, wherein the tape tension regulating means comprises a tension lever which is rotatably mounted to the sub chassis, a tension post which is provided on an upper face of the tension lever, a tension band which is connected with one side of the tension lever and which is wound around a circumference of a supply reel assembly, and a power relaying means which is rotatably mounted on the sub chassis and is provided with the cam groove at one side thereof and which is provided with first and second cam parts at the other side thereof so as to restrict a rotational angle of the tension lever, wherein a connecting pin fixed to a desired portion of the slider is inserted into the cam groove, and the latching portion of the tension lever is located in the first and second cam parts.

18. The magnetic recording/reproducing apparatus according to claim 1, wherein the running system comprises an idler power transmission controlling means which prevents a rotational force of an idle gear from transmitting to the supply reel assembly in a certain mode, wherein the idler power transmitting means comprises an idle plate which is rotatably mounted to a rotational center shaft of the central gear pulley, an idle gear which is rotatably coupled to the idle plate and which is selectively engaged with a reel gear of the supply reel assembly or a reel gear of the winding reel assembly depending to the rotational direction of the central gear pulley, a latching part which is fixed to a desired portion of the slider, and an idler stopper which is rotatably mounted to a desired portion of the upper front side of the sub chassis so as to restrict the rotation of the idle plate, the central gear pulley being rotated by a capstan motor, and wherein the idler stopper comprises a shaft portion which is supported on the sub chassis, an operational portion which is selectively latched on the latching part of the slider, an elastic rib which has a certain elastic force, and a stopper latching part which is latched on the idle plate.

19. The magnetic recording/reproducing apparatus according to claim 1 or 2, wherein the mode detecting means comprises a cassette-in-switch which is mounted on the upper face of the sub chassis and which is turned on/off depending on an loading operation of a cassette housing, a ULS switch which is mounted at a side of the main chassis so as to be turned on/off by the movement of the sub chassis, a STOP switch which is mounted at a side of the main chassis and interlocked with the shift rotating member.

20. The magnetic recording/reproducing apparatus according to claim 1, wherein the head drum device is a shaft fixed type in which a drum motor is respectively provided on a fixed shaft and an upper drum, a boss is fixed to an upper end of the fixed shaft, a disc shape back yoke is fixed to the boss, the back yoke is integrally formed with a tape guiding portion at one side of the circumference thereof, and the tape guiding portion stabilizes an entrance of the magnetic tape when the tape is loaded, and prevents the tape from being raised to the upper portion of the head drum.

21. The magnetic recording/reproducing apparatus according to claim 1, wherein a distance from a reel hub of a tape cassette which is loaded on the sub chassis to a head contacting part of the head drum device is formed to be longer than a length of a lead tape which is respectively provided at both ends of the tape, whereby the lead tape L is not reached to the head contacting part, although the lead tape is completely loosed from the reel hub.

* * * * *